(12) United States Patent
Eitan et al.

(10) Patent No.: US 8,131,465 B2
(45) Date of Patent: Mar. 6, 2012

(54) MOTION DETECTION FOR TRACKING

(75) Inventors: Alecsander P. Eitan, Haifa (IL);
Alexandru Hodisan, Haifa (IL); Ziv Kahana, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 12/249,721

(22) Filed: Oct. 10, 2008

(65) Prior Publication Data

US 2009/0153401 A1 Jun. 18, 2009

Related U.S. Application Data

(60) Provisional application No. 61/013,908, filed on Dec. 14, 2007.

(51) Int. Cl.
*G01S 3/02* (2006.01)
*G06F 19/00* (2006.01)
(52) U.S. Cl. ...... 701/221; 701/207; 342/450; 455/127.5
(58) Field of Classification Search .................. 701/221, 701/220, 207, 300; 342/357.17, 450; 455/127.5
See application file for complete search history.

(56) References Cited

U.S. PATENT DOCUMENTS

| 2003/0081657 | A1 | 5/2003 | Ranta |
| 2006/0035622 | A1* | 2/2006 | Kampel et al. ............. 455/404.2 |
| 2006/0119508 | A1* | 6/2006 | Miller ...................... 342/357.17 |
| 2007/0057779 | A1 | 3/2007 | Battista et al. |
| 2007/0239321 | A1* | 10/2007 | McAden ........................... 701/1 |

OTHER PUBLICATIONS

International Search Report and Written Opinion—PCT/US2008/086681—ISAEPO—Apr. 28, 2009.

* cited by examiner

*Primary Examiner* — Tan Q Nguyen
(74) *Attorney, Agent, or Firm* — Shyam K. Parekh; Mary A. Fales

(57) ABSTRACT

An apparatus and method for tracking a target wherein a new position fix is taken when the measured movement of the target is more than a predetermined threshold amount or when the position fix has not been updated in a predetermined interval. The apparatus and method manage energy use and network resources when performing position determination fixes.

20 Claims, 10 Drawing Sheets

IN EITHER MOTION DETECTION UNIT MEMORY 222
OR MOBILE TRACKING DEVICE MEMORY 402

| ACCUMULATOR POSITIVE INCREMENT 161 | ACCUMULATOR VALUE 227 |
|---|---|
| ACCUMULATOR NEGATIVE INCREMENT 171 | MOTION DETECTION FLAG 228 |
| PREDETERMINED ACCUMULATOR LIMIT 181 | MOBILE TRACKING DEVICE INTERRUPT FLAG 311 |
| THRESHOLD COUNTER MAXIMUM 191 | MAXIMUM SKIP COUNT 405 |
| PREDETERMINED DELAY Td 192 | MOBILE TRACKING DEVICE UNSOLICITED FIX FLAG 406 |
| COUNTER VALUE 225 | SKIP COUNTER INITIAL VALUE 501 |

FIGURE 3B

MOTION DETECTION FOR TRACKING

CROSS-REFERENCE TO RELATED APPLICATIONS

This application claims priority under 35 U.S.C. §119(e) to provisional U.S. Patent Application 61/013,908 titled "Motion detection for tracking", filed on Dec. 14, 2007, the disclosure of which is expressly incorporated by reference herein in its entirety.

BACKGROUND OF THE INVENTION

1. Field of the Invention

This disclosure relates generally to apparatus and methods for tracking of people or assets. More particularly, this disclosure relates to apparatus and methods for tracking of people or assets wherein motion detection is employed.

2. Background

Tracking systems monitor the movement of targets such as personal assets (personal property), vehicles or people. Generally speaking, tracking systems determine position, and changes in position, of the targets. There are many positioning systems, including but not limited to various satellite positioning systems (SPSs), such as the United States Global Positioning System (GPS), the Russian Glonass system, the European Galileo system, any system that uses satellites from a combination of satellite systems, or any satellite system developed in the future. Furthermore, some positioning determination systems utilize pseudolites or a combination of satellites and pseudolites. Pseudolites are ground-based transmitters that broadcast a ranging code, such as a PN code (similar to a GPS or CDMA cellular signal), modulated on a carrier signal which may be synchronized with time provided by an SPS. Pseudolites are useful in situations where SPS signals from an orbiting satellite might be unavailable. Additional terrestrial ranging sources, for example, such as AFLT may be used as alternative positioning systems.

Tracking systems frequently include one or more mobile tracking devices associated with the target(s) being tracked. Mobile tracking devices operate on portable energy sources, such as, for example, batteries. The mobile tracking devices use energy for various tasks, including but not limited to detection of signals, storage and processing of signals and data, communications, and numerical and other computations. One such computation is the determination of position location. The energy used by the mobile tracking device for computing its position location reduces the duration or lifetime of the portable energy source. Position location determinations require relatively large amounts of energy from a portable energy source.

SUMMARY OF THE DISCLOSURE

Disclosed are a method and apparatus for tracking a target. According to one aspect, a method for tracking a target comprises measuring motion data of the target and processing the motion data to generate motion information of the target, wherein the target is associated with a mobile tracking device, and using the motion information to set a mobile tracking device interrupt flag to indicate whether the mobile tracking device should be interrupted to take a position fix.

According to another aspect, a method for tracking a target comprises measuring motion data of a target and processing the motion data to generate motion information of the target, wherein the target is associated with a mobile tracking device, and using the motion information to set a motion detection flag to be used by the mobile tracking device in determining whether to take a position fix.

According to yet another aspect, a mobile tracking device comprises a motion detection unit for measuring motion data of a target, wherein the motion detection unit processes the motion data to generate motion information of the target, and uses the motion information to set an interrupt flag, and a first processing unit for using the interrupt flag to determine whether to take a position fix.

Some embodiments of the present invention provide for a method for tracking a target associated with a motion detection unit and a mobile tracking unit, the method comprising: initializing an accumulator; processing the motion data to generate motion information; and quantizing the motion information into three levels then incrementing the accumulator by a positive increment, if the motion information falls into a first level; bypassing adjusting the accumulator, if the motion information falls into a second level; and decrementing the accumulator by a negative increment, if the motion information falls into a third level; comparing the accumulator to an accumulator limit; and taking a position fix, if the accumulator meets the accumulator limit.

Some embodiments of the present invention provide for a device for tracking a target, the device comprising: a motion detection unit comprising a sensor to provide motion data; an accumulator; a processor to process the motion data to generate motion information; a quantizer to quantize the motion information into three levels; an adder to increment the accumulator by a positive increment, if the motion information falls into a first level; logic to bypass adjusting the accumulator, if the motion information falls into a second level; a subtractor to decrement the accumulator by a negative increment, if the motion information falls into a third level; a comparator to compare the accumulator to an accumulator limit; and a mobile tracking unit to take a position fix, if the accumulator meets the accumulator limit.

Some embodiments of the present invention provide for a device for tracking a target associated with a motion detection unit and a mobile tracking unit, the device comprising: means for initializing an accumulator; means for processing the motion data to generate motion information; and means for quantizing the motion information into three levels then means for incrementing the accumulator by a positive increment, if the motion; information falls into a first level; means for bypassing adjusting the accumulator, if the motion information falls into a second level; and means for decrementing the accumulator by a negative increment, if the motion information falls into a third level; means for comparing the accumulator to an accumulator limit; and means for taking a position fix, if the accumulator meets the accumulator limit.

Some embodiments of the present invention provide for a computer-readable medium including program code stored thereon for use in a mobile device to track a target associated with a motion detection unit and a mobile tracking unit, the program code comprising: program code to initialize an accumulator; program code to process the motion data to generate motion information; and program code to quantize the motion information into three levels then program code to increment the accumulator by a positive increment, if the motion information falls into a first level; program code to bypass adjusting the accumulator, if the motion information falls into a second level; and program code to decrement the accumulator by a negative increment, if the motion information falls into a third level; program code to compare the accumulator to an accumulator limit; and program code to take a position fix, if the accumulator meets the accumulator-limit.

Some embodiments of the present invention provide for a method for tracking a target associated with a motion detection unit and a mobile tracking unit, the method comprising: measuring motion of the target to produce motion data; processing the motion data to generate motion information; and comparing the motion information to a threshold; and if the motion information is greater than the threshold, instructing the mobile tracking unit to take a position fix; and if the motion information is less than the threshold, skipping to take a position fix. Some embodiments further comprising: setting a flag, if the motion information is greater than a threshold, to allow the motion detection unit to instruct the mobile tracking unit to take a position fix; and wherein the act of instructing the mobile tracking unit to take the position fix comprises instructing the mobile tracking unit, base on the flag being set, to take a position fix. In some embodiments the flag is an interrupt flag. Some embodiments further comprising clearing a flag, if the motion information is less than a threshold, to block the motion detection unit from instructing the mobile tracking unit from taking a position fix. In some embodiments the act of instructing the mobile tracking unit to take the position fix comprises enabling; an interrupt flag. In some embodiments the act of skipping to take the position fix comprises disabling ah interrupt flag. In some embodiments the act of instructing the mobile tracking unit to take the position fix comprises: sending an interrupt signal from the motion detection unit to the mobile tracking unit; and taking a position fix, by the mobile tracking unit, based on the interrupt signal. Some embodiments further comprising waking the motion detection unit from a sleep state. In some embodiments the act of setting the flag comprise enabling the motion detection unit to interrupt the mobile tracking device to take a position fix. Some embodiments further comprising: incrementing a skip counter, if the motion information is less than the threshold; comparing the skip counter to a maximum skip count; and instructing the mobile tracking unit, if the skip counter is greater than the maximum skip count, to take a position fix. Some embodiments further comprising: comparing a timer to a maximum skip time; and instructing the mobile tracking unit, if the timer is greater than the maximum skip time, to take a position fix. In some embodiments the act of processing the motion data to generate motion information comprises: generating a number of transitions based on the motion data; comparing the number of transitions to a high threshold value; and incrementing the accumulator value, if number of transitions is greater than the high threshold value. In some embodiments the motion information comprises the accumulator value. In some embodiments the act of incrementing the accumulator value comprises incrementing the accumulator value by an accumulator positive increment. In some embodiments the act of processing the motion data to generate motion information further comprises: comparing the number of transitions to a low threshold value; and decrementing an accumulator value, if number of transitions is less than the low threshold value. In some embodiments the act of decrementing the accumulator value comprises decrementing the accumulator value by an accumulator negative increment:

Some embodiments of the present invention provide for a mobile device to track a target, the mobile device comprising: a motion detection unit including a sensor to measure motion data of the target; and a processor to generate motion information from the motion data; and a mobile tracking unit, coupled by a signal to the motion detection unit, to take a position fix based on the signal. In some embodiments the sensor comprises an omni-directional tilt and vibration sensor. In some embodiments the signal is an interrupt signal. In some embodiments the signal causes the mobile tracking unit to wake from a sleep state to take a position fix. Some embodiments further comprising a skip counter; a maximum skip count; a comparator to compare the skip counter to the maximum skip count; and logic to instruct the mobile tracking unit, if the skip counter is greater than the maximum skip count, to take a position fix. Some embodiments further comprising: a first counter, wherein the counter count a number of times the mobile tracking device skips taking the position fix. Some embodiments further comprising: a timer; a maximum skip time; a comparator to compare the timer to the maximum skip time; and logic to instruct the mobile tracking unit, if the timer is greater than the maximum skip time, to take a position fix. Some embodiments further comprising: a counter to count a number of transitions based on the motion data; a comparator to compare the number of transitions to a high threshold value; and an adder to increment an accumulator value, if number of transitions is greater than the high threshold value, wherein the motion information comprises the accumulator value.

Some embodiments of the present invention provide for a mobile device to track a target associated with a motion detection unit and a mobile tracking unit, the mobile device comprising: means for measuring motion of the target to produce motion data; means for processing the motion data to generate motion information; and means for comparing the motion information to a threshold; means for instructing the mobile tracking unit to take a position fix, if the motion information is greater than the threshold; and means for skipping to take a position fix, if the motion information is less than the threshold. Some embodiments further comprising: means for setting a flag, if the motion information is greater than a threshold, to allow the motion detection unit to instruct the mobile tracking unit to take a position fix; and wherein the means for instructing the mobile tracking unit to take the position fix comprises means for instructing the mobile tracking unit, base on the flag being set, to take a position fix. In some embodiments the flag is an interrupt flag. In some embodiments the means for instructing the mobile tracking unit to take the position fix comprises: means for sending an interrupt signal from the motion detection unit to the mobile tracking unit; and means for taking a position fix, by the mobile tracking unit, based on the interrupt signal. Some embodiments further comprising: means for incrementing a skip counter, if the motion information is less than the threshold; means for comparing the skip counter to a maximum skip count; and means for instructing the mobile tracking unit, if the skip counter is greater than the maximum skip count, to take a position fix. Some embodiments further comprising: means for comparing a timer to a maximum skip time; and means for instructing the mobile tracking unit, if the timer is greater than the maximum skip time, to take a position fix.

Some embodiments of the present invention provide for a computer-readable medium including program code stored thereon for use in a mobile device to track a target associated with a motion detection unit and a mobile tracking unit, the program code comprising: program code to measure motion of the target to produce motion data; program code to process the motion data to generate motion information; and program code to compare the motion information to a threshold; program code to instruct the mobile tracking unit to take a position fix, if the motion information is greater than the threshold; and program code to skip to take a position fix, if the motion information is less than the threshold. Some embodiments further comprising: program code to set a flag, if the motion information is greater than a threshold, to allow the motion detection unit to instruct the mobile tracking unit to take a position fix; and wherein the program code to instruct the mobile tracking unit to take the position fix comprises program code to instruct the mobile tracking unit, base on the flag being set, to take a position fix. In some embodiments the flag is an interrupt flag. In some embodiments the program code to instruct the mobile tracking unit to take the position fix comprises: program code to send an interrupt signal from the motion detection unit to the mobile tracking unit; and program code to take a position fix, by the mobile tracking unit, based on the interrupt signal. Some embodiments further comprising: program code to increment a skip counter, if the motion information is less than the threshold; program code to compare the skip counter to a maximum skip count; and program code to instruct the mobile tracking unit, if the skip counter is greater than the maximum skip count, to take a position fix. Some embodiments further comprising: program code to compare a timer to a maximum skip time; and program code to instruct the mobile tracking unit, if the timer is greater than the maximum skip time, to take a position fix.

It is understood that other aspects will become readily apparent to those skilled in the art from the following detailed description, wherein it is shown and described various aspects and features by way of illustration. The drawings and detailed description are to be regarded as illustrative in nature and not as restrictive.

BRIEF DESCRIPTION OF THE DRAWINGS

FIGS. 3A and 3B illustrate block diagrams of an arrangement of components of an aspect of a motion detection unit, in accordance with embodiments of the present invention.

DETAILED DESCRIPTION

Figure 1:
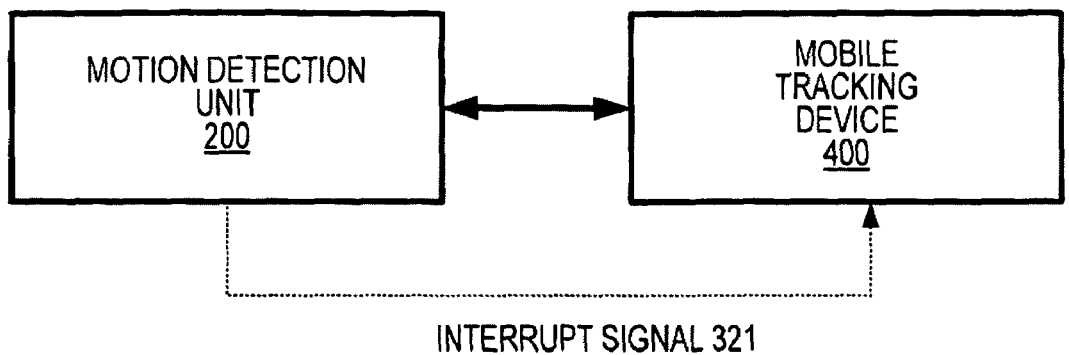
FIG. 1 is an illustrative block diagram of a motion detection unit and a mobile tracking device, in accordance with embodiments of the present invention.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

A position location determination can be saved and partially or wholly reused, thus reducing the energy expended to make a new position location determination, when it can be determined that the movement of the tracked target was less than a predetermined amount. By doing so, this can free processing and computational resources to perform other tasks, or perform other tasks more efficiently or quickly. Additionally, the lifetime of a portable energy source of the mobile tracking device can be extended, thereby facilitating a longer operating period for the mobile tracking device and reducing the need for recharging, refreshing, replenishing or replacing the portable energy source(s) of the mobile tracking devices.

One skilled in the art would understand that a mobile tracking device can include devices such as cellular or other wireless communication devices, personal communication system (PCS) devices, personal navigation devices, laptops or other suitable mobile devices capable of receiving and processing signals from an SPS or other terrestrial sources. A mobile tracking device can also include devices that communicate with a personal navigation device (PND), such as by short-range wireless, infrared, wireline connection, or other connection—regardless of whether satellite signal reception, assistance data reception, and/or position-related processing occurs at the device or at the PND. A mobile tracking device can also include computers, laptops, etc. which are capable of communication with a server, such as via the Internet, WiFi, or other network, and regardless of whether satellite signal reception, assistance data reception, and/or position-related processing occurs at the device, at a server, or at another device via a network. One skilled in the art would also understand that any operable combination of the above are also considered a mobile tracking device.

Described herein are apparatus and methods for tracking a target wherein a new position fix is taken selectively taken when the measured movement of the target is more than a predetermined threshold amount and/or when the position fix has not been updated in a predetermined interval of time and/or when the position fix has not been taken for a predetermined number of cycles. A goal of the apparatus and methods is to minimize energy use and network resources by performing position determination fixes only when needed.

FIG. 1 is an illustrative block diagram of a motion detection unit and a mobile tracking device, in accordance with embodiments of the present invention. The figure shows a mobile tracking device 400 coupled to a motion detection unit 200. The communication between the motion detection unit 200 and the mobile tracking device 400 may be via a hardwired connection or bus, or via a wireless connection. Although not shown alternatively, the motion detection unit 200 could be part of the mobile tracking device 400.

Figure 2:
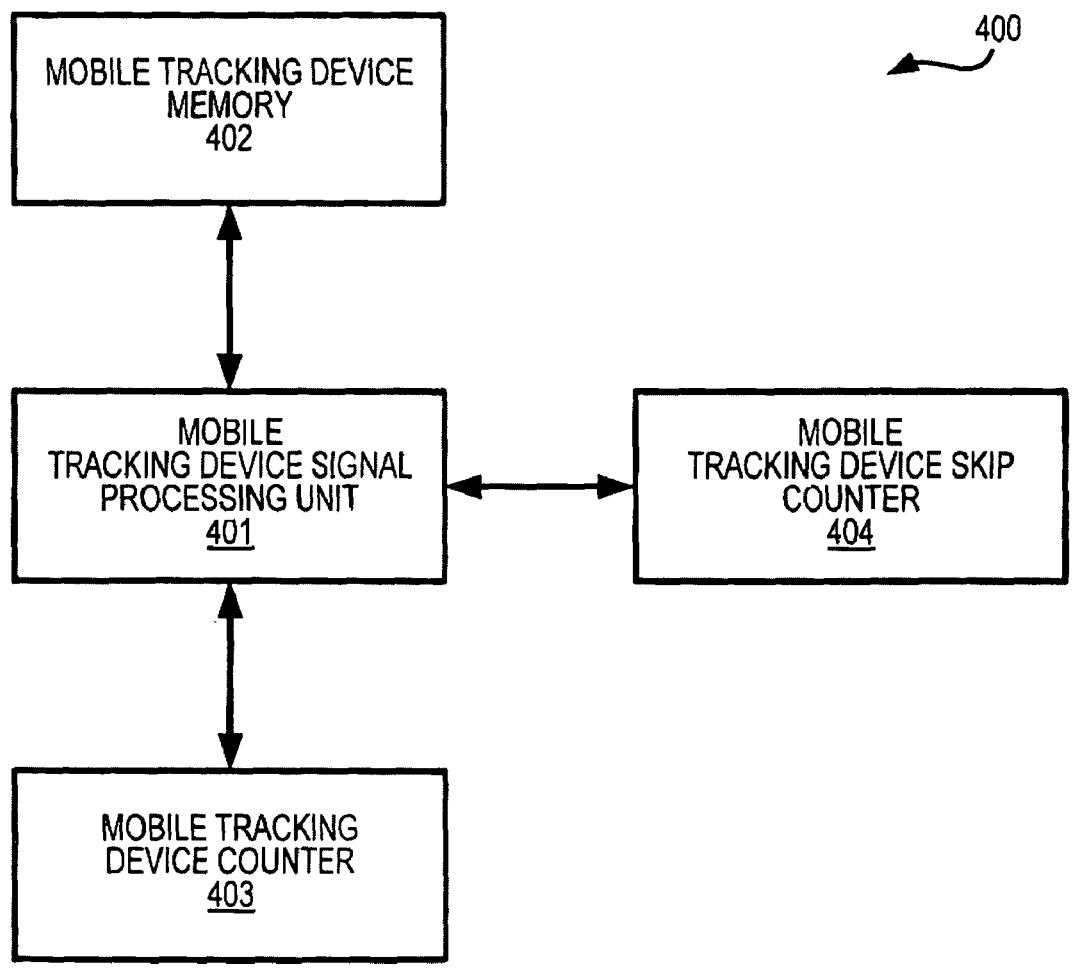
FIG. 2 is an illustrative block diagram of an arrangement of components of an aspect of a mobile tracking device, in accordance with embodiments of the present invention.

FIG. 2 is an illustrative block diagram of an arrangement of components of an aspect of a mobile tracking device, in accordance with embodiments of the present invention. As shown, the mobile tracking device 400 comprises a signal processing unit 401 and is capable of receiving pseudoranges from various satellite positioning systems (SPSs), such as but not limited to the United States Global Positioning System (GPS), the Russian Glonass system, the European Galileo system, and/or any system that uses satellites from a combination of satellite systems. Furthermore, pseudoranges may be received from position determination systems that utilize pseudolites or a combination of satellites and pseudolites. In one aspect, terrestrial ranging sources may include Advanced Forward Link Trilateration (AFLT). The pseudoranges are used to determine position location of the mobile tracking device 400. As used herein, the signal processing unit 401 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The mobile tracking device 400 further comprises a memory 402 coupled to the signal processing unit 401. Any machine readable medium may be used in implementing the methodologies described herein. For example, data or signals received from the motion detection unit 200 may be stored in the memory 402. Instructions to be executed by the signal processing unit 401 may also be, stored in the memory 402. Intermediate data or information determined or used by the signal processing unit 401 may also be stored in memory 402. The memory 402 may include memory locations and/or registers storing values that may serve as flags used in implementing the methodologies described herein. As used herein, the memory 402 refers to any type of long term, short term, volatile, nonvolatile, or the other memory and is not to be limited to any particular type of memory or number of memories, or type of media upon which memory is stored. Although shown in FIG. 2 as external to the signal processing unit 401, alternatively, the memory 402 or a portion thereof may be implemented within the signal processing unit 401.

The mobile tracking device 400 may also include a counter 403 coupled to the signal processing unit 401. In one aspect, the counter 403 is used to count various events as designated by the signal processing unit 401. One of ordinary skill in the art would understand that the counter 403 may count in various units. For example, the counter 403 may count units of time or the passage of time, e.g., seconds, minutes, hours, etc. Alternatively, the counter 403 may count iterations, e.g., the number of times a set of instructions or software code has been executed. As used herein, the counter 403 refers to any type of counter, and is not limited to any particular type of counter or number of counters. In one aspect, the counter 403 as a hardware implementation. In another aspect, the counter 403 includes a software implementation. Although shown in FIG. 2 as external to the signal processing unit 401, alternatively, the counter 403 or a portion thereof may be implemented within the signal processing unit 401. In one aspect, the counter 403 may be a skip counter 404.

Figure 3A:
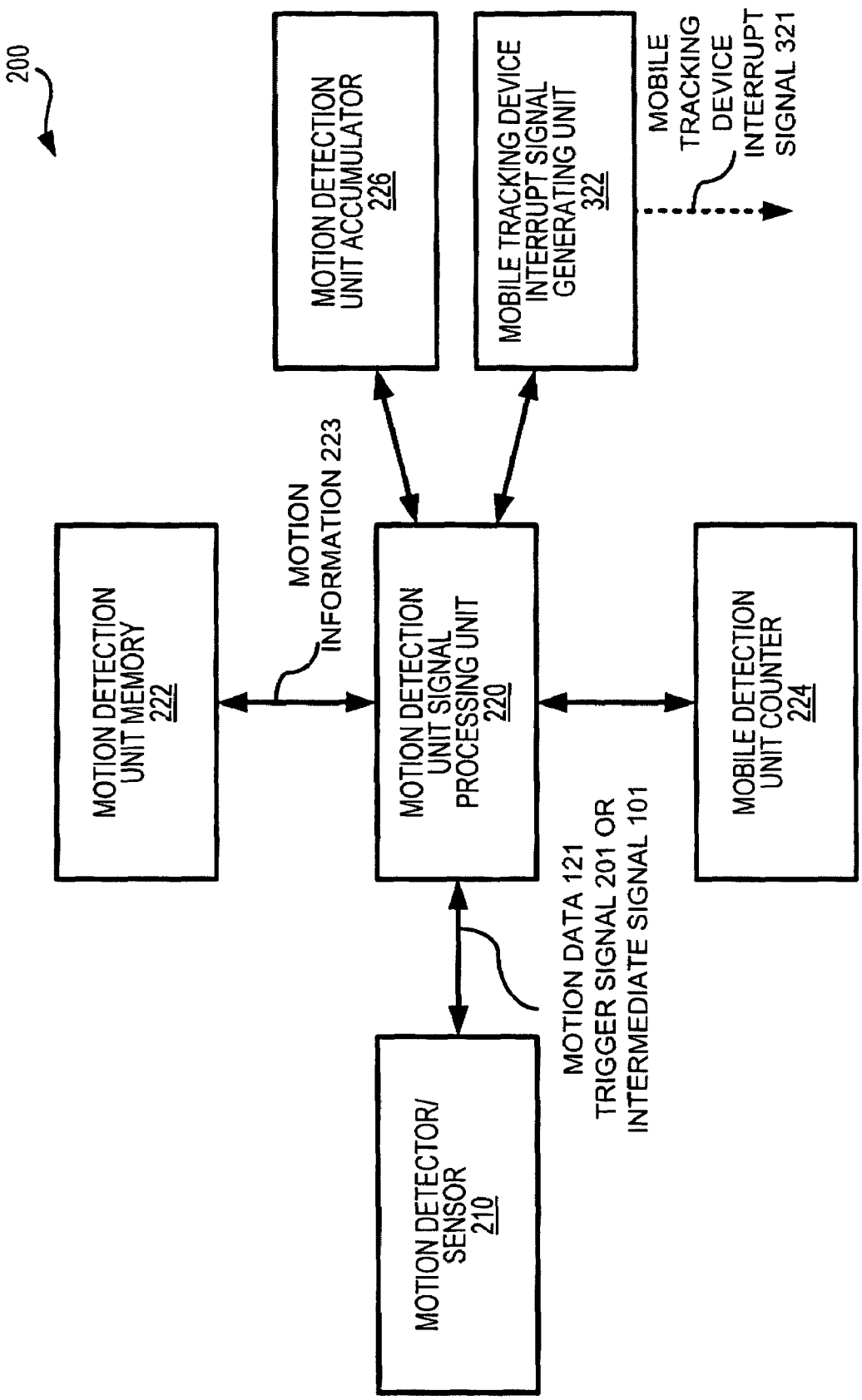

FIGS. 3A and 3B illustrate block diagrams of an arrangement of components of an aspect of a motion detection unit, in accordance with embodiments of the present invention. FIG. 3A is a block diagram illustrating an arrangement of components forming a motion detection unit 200 that can perform motion detection to enhance a mobile tracking device 400. The motion detection unit 200 includes a motion detector/sensor 210, that can detect movement or is otherwise affected by movement of the motion detection unit 200. The motion detector/sensor 210 can be a roll ball, tilt detector, level, vibration sensor, accelerometer, gyro or any other device that is affected by movement. In one aspect, the motion detector/sensor 210 may be an SQ-SEN-200 omni-directional tilt and vibration sensor or SMB380 from Bosch. One skilled in the art would understand that various forms of motion detector/sensors can be used without limiting the scope of the disclosure. Additionally, one skilled in the art would understand that the motion detector/sensors can be sensitive to any number of axes and need not be limited, for example, to a 3-axis motion detector/sensor.

The motion detection unit 200 further includes a signal processing unit 220. The motion detector/sensor 210 is coupled to the signal processing unit 220 for processing data measured by the motion detector/sensor 210. In one aspect, the motion detector/sensor 210 is a single device while in another aspect, the motion detector/sensor 210 comprises of several devices or portions thereof. The signal processing unit 220 of the motion detection unit 200 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. In one aspect, the signal processing unit 220 of the motion detection unit 200 is a low power microprocessor or low power microcontroller.

The motion detection unit 200 further includes a memory 222 coupled to the signal processing unit 220 in the motion detection unit 200. Any machine readable medium may be used in implementing the methodologies described herein. For example, data from the motion detector/sensor 210 may be stored in memory 222. Instructions to be executed by the signal processing unit 220 also may be stored in memory 222. Intermediate data or information determined or used by the signal processing unit 220 also may be stored in memory 222. Thresholds used by the signal processing unit 220 may be stored in memory 222. Memory 222 may include memory locations and/or registers storing values that may serve as flags used in implementing the methodologies described herein. As used herein, memory 222 refers to any type of long term, short term, volatile, nonvolatile, or the other memory and is not to be limited to any particular type of memory or number of memories, or type of media upon which memory is stored. Although shown in FIG. 3A as external to the signal processing unit 220, alternatively, memory 222 or a portion thereof may be implemented within the signal processing unit 220.

The motion detection unit 200 includes at least one counter 224 coupled to the signal processing unit 220. In one aspect, the counter 224 is used to count various events as designated by the signal processing unit 220. One of ordinary skill in the art would understand that the counter 224 may count in various units. For example, the counter 224 may count seconds, minutes, hours, etc. Alternatively, the counter 224 may count iterations (e.g., the number of times a set of instructions or software code forming a loop has been executed). As used herein, counter 224 refers to any type of counter, and is not limited to any particular type of counter or number of counters. In one aspect, the counter 224 is a hardware implementation. In another aspect, the counter 224 includes a software implementation. Although shown in FIG. 3A as external to the signal processing unit 220, alternatively, the counter 224 or a portion thereof may be implemented within the signal processing unit 220 or within memory 222 or combination thereof.

In one aspect, the motion detection unit 200 includes an accumulator 226 for data processing or computation. In one aspect, the accumulator 226 is implemented within memory 222. In another aspect, the accumulator 226 is implemented within the signal processing unit 220. In another aspect, the accumulator 226 is implemented within the counter 224.

Although not shown in FIG. 2, in one aspect, the signal processing unit 401, the memory 402, and the counter 403 of the mobile tracking device 400 may be coupled via a mobile tracking device bus (not shown). Similarly, although not shown in FIG. 3A, in one aspect, the motion detector/sensor 210, the signal processing unit 220, memory 222, and the counter 224 may be coupled via a motion detection unit bus (not shown). In one aspect, the mobile tracking device bus is coupled to the motion detection unit bus. In another aspect, the motion detection unit bus or a portion thereof is implemented as part of the mobile tracking device bus.

As illustrated in FIG. 1, the mobile tracking device 400 is able to communicate with the motion detection unit 200. In one aspect, one or more of the components of the mobile tracking device 400 is able to communicate with one or more of the components of the motion detection unit 200. In another aspect, memory 222 is coupled to or is implemented as part of the memory 402. In another aspect, the signal processing unit 220 is coupled to or is implemented as part of the signal processing unit 401. In another aspect, the signal processing unit 220 is coupled to the memory 402. In another aspect, the signal processing unit 401 is coupled to memory 222.

In one aspect, the mobile tracking device 400 is able to disable the components of the motion detection unit 200, for example, to place the signal processing unit 220 into a sleep mode.

The mobile tracking device 400 may periodically or at predetermined times determine its position location, sometimes referred to as taking a position fix. As described herein, in certain implementations, the period or time between fixes can be increased if it can be determined that the mobile tracking device 400 or the target being tracked associated with the mobile tracking device 400 has not moved. If the mobile tracking device 400 of the target being tracked associated with the mobile tracking device 400 has not moved, the mobile tracking device 400 may not need to renew its position fix as often, and can skip taking a position fix in certain instances. On the other hand, if the mobile tracking device 400 or the target being tracked associated with the mobile tracking device 400 has moved, the mobile tracking device 400 can take a position fix at the predetermined time or sooner if desired.

As described herein, the motion detector/sensor 210 is used to detect motion, such as magnitude of motion, duration of motion, displacement, velocity, acceleration, etc., (motion data 121) of the target being tracked with which the motion detection unit 200 is associated. The signal processing unit 220 processes the motion data 121 obtained from the motion detector/sensor 210. The processed motion data 121 is labeled herein as motion information 223. The signal processing unit 220 stores the motion information 223 in memory 222. The motion information 223 can include a motion detection flag 228. In one aspect, the motion detection flag 228 can be set to at least one value indicating that motion greater than or equal to a threshold amount of motion was detected (e.g., a "sufficient motion amount"), and at least one other value indicating that motion greater than or equal to a threshold amount of motion was not detected. One skilled in the art would understand that the value of the "sufficient motion amount" is determined by the target being tracked and by the application parameters. In one aspect, the motion detection unit 200 computes the displacement and enables the mobile tracking device 400 to compute ah updated location by combining the last position fix and the displacement. The mobile tracking device 400 may then use the updated location information for decision making.

The motion information 223 can be used by the mobile tracking device 400 to determine whether or not to take a new position fix. In one aspect, if the motion information 223 indicates that motion greater than or equal to a threshold amount of motion was not detected, the mobile tracking device 400 may not take a new position fix at the end of a period between fixes or at a predetermined time, but rather may skip taking a new position fix, and maintain or rely on a previously determined position location. In one aspect, if the motion information 223 indicates that motion greater than or equal to a threshold amount of motion was detected, the mobile tracking device 400 will take a new position fix at the end of a period between fixes or at a predetermined time. In one aspect, the number of times that a mobile tracking device 400 skips taking a position fix can be limited to a predetermined number.

In another, aspect, if the motion information 223 indicates that motion greater than or equal to a threshold amount of motion was detected, the motion detection unit 200 can generate a mobile tracking device interrupt signal 321 (FIG. 1), after a predetermined delay Td 192, to interrupt or awaken the mobile tracking device 400, and cause the mobile tracking device 400 to update its position location information. In another aspect, the mobile tracking device 400 can enable or disable interruptions from the motion detection unit 200.

Figure 4:
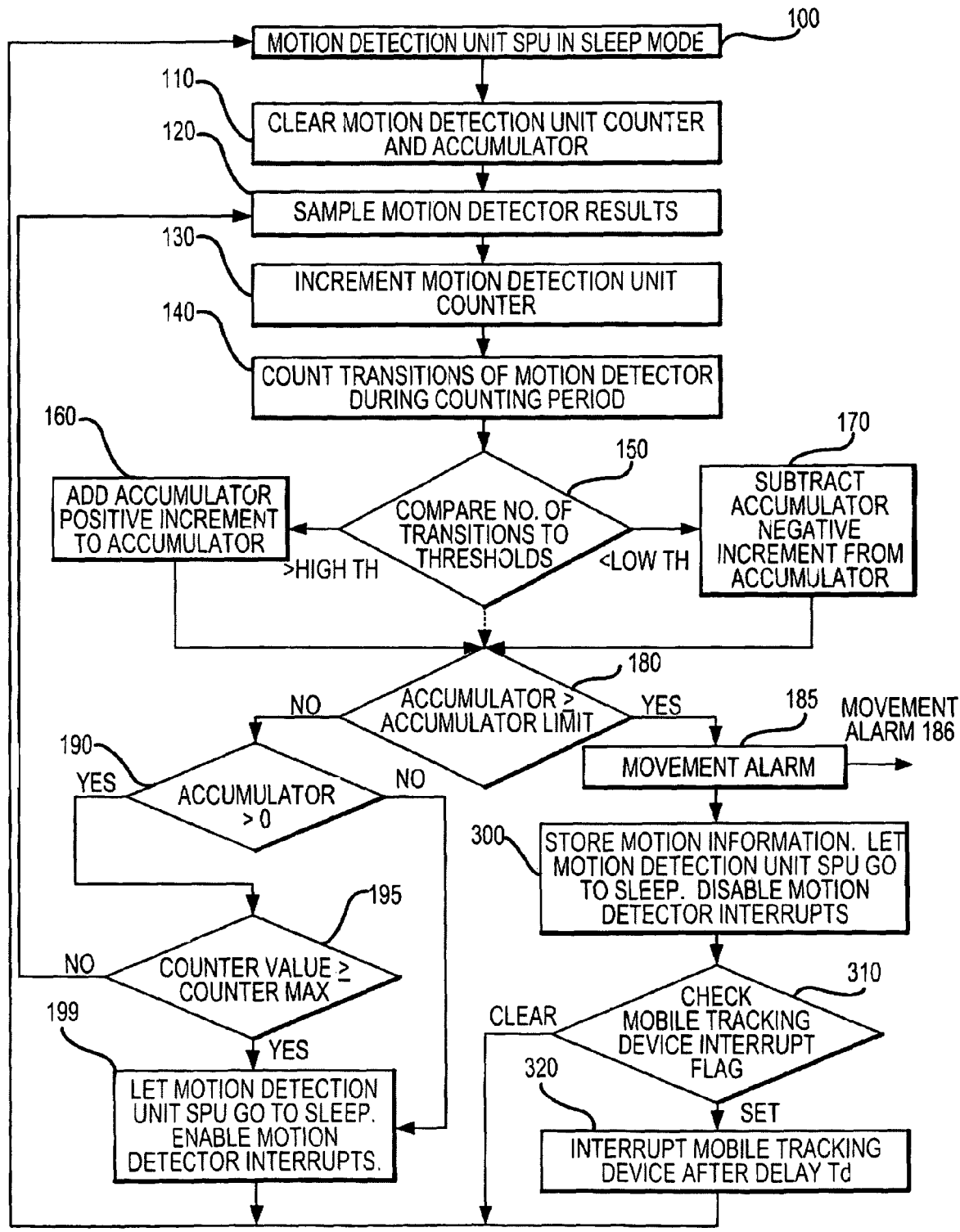
FIG. 4 illustrates a flow diagram for determining movement of a target being tracked, in accordance with embodiments of the present invention.

FIG. 4 illustrates a flow diagram for determining movement of a target being tracked, in accordance with embodiments of the present invention. The flow diagram provides one illustrative routine to be implemented by the motion detection unit 200. In block 100, the signal processing unit 220 is in sleep mode. If the motion detector/sensor 210 detects motion, the motion detector/sensor 210 generates a trigger signal 201 (FIG. 3A) in response to the detected motion. The trigger signal 201 from the motion detector/sensor 210 will interrupt the sleep mode and wake the signal processing unit 220 out of sleep mode. In an alternative aspect, the trigger signal 201 is generated by the signal processing unit 220 in response to an intermediate signal 101 from the motion detector/sensor 210. The intermediate signal 101 indicates, that motion has been detected by the motion detector/sensor 210.

In block 110, the counter 224 and the accumulator 226 of the motion detection unit 200 are set to zero (i.e., a cleared state). Alternatively, the counter 224 and the accumulator 226 can be set to predetermined commencing values rather than to zero. One skilled in the art would understand that the predetermined commencing values are chosen based on the design or application parameters.

In block 120, motion data 121 measured by the motion detector/sensor 210 is sampled. The sampling of the motion data 121 may be performed by the motion detector/sensor 210, or the signal processing unit 220. If sampling is performed by the motion detector/sensor 210, the sample values are transmitted to the signal processing unit 220. The sample values may be stored in memory 222. In one aspect, the sampling frequency is set at 500 Hz or above.

Following block 120, in block 130, the counter 224 is incremented. In one aspect, the increment is in units of time since the counter 224 is set to count time. In an alternative aspect, the counter 224 increment is in units of iterations, e.g., the counter 224 is set to count the quantity of times the flow process loops back though block 130.

In block 140, the number of transitions made by the motion detector/sensor 210 in a predetermined counting period is counted. In one aspect, a transition is defined as an incidence of detecting a motion. For example, the number of transitions from a low signal level to a high signal level measured by the motion detector/sensor 210 may be counted. Or, the number of transitions from a high signal level to a low signal level may be counted. Alternatively, the number of transitions from a low signal level to a high signal level and the number of transitions from a high signal level to a low signal level may be counted. One skilled in the art would understand that the parameter for defining a transition may vary according to the design or application parameters without affecting the scope of the disclosure.

In one aspect, the motion detector/sensor 210 counts the transition. In another aspect, the signal processing unit 220 counts the transition. In one aspect, the number of transitions counted is stored in memory 222. And, in one aspect, the counting period is set to one second.

In block 150, the number of transitions counted is compared with two threshold values, a high threshold value (High TH) and a low threshold value (Low TH). In one aspect, this comparison is made by the signal processing unit 220. If the number of transitions counted during the counting period is greater than the High TH, proceed to block 160. If the number of transitions counted during the counting period is lower than the Low TH, proceed to block 170. Otherwise, proceed to block 180. In other words, if the number of transitions counted during the counting period is greater than or equal to the Low TH and also is less than or equal to the High TH, proceed to block 180. In one aspect, the value of High TH is set to 2 and the value of Low TH is set to 1. One of ordinary skill in the art would understand that the values of High TH and Low TH may be chosen according to the system parameters, such as but not limited to, the sampling frequency or to the inherent parameters of the motion detector/sensor used. One of ordinary skill in the art also would understand that the values of High TH and Low TH may be selected so that the routine proceeds from block 150 to either block 160 or 170, but never proceeds from block 150 directly to block 180, illustrated in FIG. 4 by the dashed arrow between block 150 and block 180. In one aspect, the number of transitions in block 150 is replaced by another suitable indication according to the particular application.

FIG. 3B shows various variables and predetermined parameters stored in memory. Memory may be may consist of memory front the motion diction unit memory 222 and/or the mobile tracking device memory 402. Shown are an accumulator positive increment 161, an accumulator negative increment 171, a predetermined accumulator-limit 181, a threshold counter maximum 191, a predetermined delay Td 192, a counter value 225, an accumulator value 227, a motion detection flag 228, a mobile tracking device interrupt flag 311, a maximum skip count 405, a mobile tracking device unsolicited fix flag 406 and a skip counter initial value 501. The parameters may be held in ROM, RAM, and/or the like. These variables and predetermined parameters may be stored in either memory from the motion diction unit memory 222 and/or the mobile tracking device memory 402.

In block 160, a predetermined accumulator positive increment 161 is added to the value found in the accumulator 226 (accumulator value 227) before proceeding to block 180. Thus, if the number of transitions Counted is greater than the High TH, the accumulator value 227 is incremented, for example, by a predetermined accumulator positive increment 161. In block 170, the accumulator value 227 is decremented by a predetermined accumulator negative increment 171 before proceeding to block 180. Thus, if the number of transitions counted is less than the Low TH, the accumulator value 227 is decreased by the predetermined accumulator negative increment 171. In one aspect, the accumulator negative increment 171 is set to 1. In one aspect, the accumulator positive increment 161 is set to 5. If the number of transitions counted during the counting period is greater than or equal to the Low TH and also is less than or equal to the High TH, the accumulator value 227 is not changed. In one aspect, features of blocks 150, 160 and 170 may result in fast attack and/or slow delay that can detect significant motion while avoiding false alarm due to small movements.

In block 180, the accumulator value 227 is compared with a predetermined accumulator limit 181. In one aspect, the comparison is performed by the signal processing unit 220. The value of the predetermined accumulator limit 181 corresponds to the sensitivity of the motion detection unit 200.

If the accumulator value 227 is equal to or greater than the predetermined accumulator limit 181, then a movement alarm 186 is generated in block 185. In one aspect, the movement alarm 186 may comprise setting the motion detection flag 228 to a value indicating that motion greater than or equal to a threshold amount of motion was detected.

From block 185, proceed to block 300 to store motion information 223 in memory 222. Additionally, at block 300, the motion detection unit 200 can let the signal processing unit 220 go to sleep mode, and disable the motion detector/sensor 210 interrupts. One reason the motion detector/sensor interrupts are disabled is to prevent overwriting the motion information 223 stored in memory 222 until the motion information 223 has been made available to the mobile tracking device 400. Another reason is to save power. Alternatively, one of ordinary skill in the art would understand that the motion information 223 can comprise more than one instance of detected motion, in which case the motion detector interrupt would remain enabled. In another aspect, a new motion information 223 is stored in memory 222 if the new motion information 223 corresponds to greater motion than the previous motion information 223 stored in memory 222.

If the accumulator value 227 is less than the predetermined accumulator limit 181, proceed to block 190, where the accumulator value 227 is compared with the value zero. One skilled in the art would understand that another value, other than zero, could be chosen based on the design choice and application parameters. In one aspect, the value zero represents the initial iteration. If the accumulator value 227 is not greater than zero, proceed to block 199 and put the signal processing unit 220 in sleep mode, and enable the motion detector/sensor 210 interrupts if they are not already enabled.

If the accumulator value 227 is greater than zero in the comparison of block 190, in block 195, the value of the counter 224 (counter value 225) is compared with a threshold counter maximum 191.

The threshold counter maximum 191 is a pre-stored threshold value that indicates the quantity of times the motion data 121 will be sampled. In an alternative aspect, the threshold counter maximum 191 is a pre-stored threshold value that indicates the duration the sampling will continue. In one example, the threshold counter maximum 191 is set to 20 seconds. In another example, the threshold counter maximum 191 is set to infinite. In this aspect, the motion detection unit 200 will continue to sample the motion detector/sensor until sufficient motion is detected.

If the value of the counter 224 is less than threshold counter maximum 191, the flow process returns to block 120, and the motion data 121 is sampled again. If the value of the counter 224 is greater than or equal to threshold counter maximum 191, proceed to block 199 and let the signal processing unit 220 go to sleep mode, and enable the motion detector/sensor 210 interrupts if they are not already enabled. In one aspect, if the counter value 225 is equal to or greater than threshold counter maximum 191, the motion detection flag 228 is cleared, or set to a value indicating that insufficient motion was detected to satisfy motion threshold criteria. One skilled in the art would understand that other threshold criteria can be set without affecting the scope of the disclosure.

In one aspect, the mobile tracking device interrupt flag 311 is set by the signal processing unit 220 to indicate if the mobile tracking device 400 should be interrupted. In block 310, the status of a mobile tracking device interrupt flag 311 is checked. In one aspect, the mobile tracking device interrupt flag 311 includes at least one value to indicate that the mobile tracking device 400 should be interrupted if sufficient movement of the target being tracked has been detected. In another aspect, the mobile tracking device interrupt flag 311 includes at least one value indicating that the mobile tracking device 400 should not be interrupted. One of ordinary skill in the art would understand that the values of the mobile tracking device interrupt flag 311 can be set in various manners. For example, the values of the mobile tracking device interrupt flag 311 can be set by the mobile tracking device 400, the signal processing unit 220, or a user of the mobile tracking device 400. One of ordinary skill in the art would understand that the mobile tracking device interrupt flag 311 may be stored in a memory 222, or a mobile tracking device memory 402.

If the value of the mobile tracking device interrupt flag 311 indicates that the mobile tracking device 400 should not be interrupted, the motion detection unit routine returns to block 100. At block 320, if the value of the mobile tracking device interrupt flag 311 indicates that the mobile tracking device 400 should be interrupted, the motion detection unit 200 generates a mobile tracking device interrupt signal 321 to interrupt the mobile tracking device 400. In one aspect, the mobile tracking device interrupt signal 321 may be generated by a mobile tracking device interrupt signal generating unit 322 (FIG. 3A). The mobile tracking device interrupt signal generating unit 322 may be part of the signal processing unit 220, or a component that is not within the motion detection unit 200, such as a buffer.

The mobile tracking device interrupt signal 321 is communicated to the mobile tracking device 400 after a predetermined delay Td 192. Alternatively, the mobile tracking device interrupt signal 321 is generated after a predetermined delay Td 192. One of ordinary skill in the art would understand that the value of the predetermined delay Td 192 can be set in various manners. For example, the value of the predetermined delay Td 192 can be set by the mobile tracking device 400, the signal processing unit 220, or a user of the mobile tracking device 400. One of ordinary skill in the art would understand that the value of the predetermined delay Td 192 may be stored in a memory 222, or a mobile tracking device memory 402.

The mobile tracking device 400 uses the motion information 223, including, if implemented, the motion detection flag 228, to determine whether to update the last position fix. In one aspect, if the motion information 223 indicates that sufficient motion was not detected, the mobile tracking device 400 can skip taking a position fix. If the motion information 223 indicates that sufficient motion was detected, the mobile tracking device 400 can take a new position fix. In one aspect, the mobile tracking device interrupt signal 321 can be used to cause the mobile tracking device 400 to take a position fix more promptly than it ordinarily might.

In one aspect, the mobile tracking, device 400 checks the status of the motion detection flag 228 before taking a position fix. If the motion detection flag 228 indicates that sufficient motion was detected, for example, if the motion detection flag 228 is set, the mobile tracking device 400 takes a position fix. If the motion detection flag 228 indicates that sufficient motion was not detected, for example, if the motion detection flag 228 is clear, the mobile tracking device 400 skips taking a position fix, unless the mobile tracking device 400 has already skipped taking a position fix a predetermined maximum number of times, in which case the mobile tracking device 400 takes a position fix. In one aspect, a mobile tracking device skip counter 404 counts the number of times the mobile tracking device 400 skips updating the last position fix with a new position fix.

Figure 5:
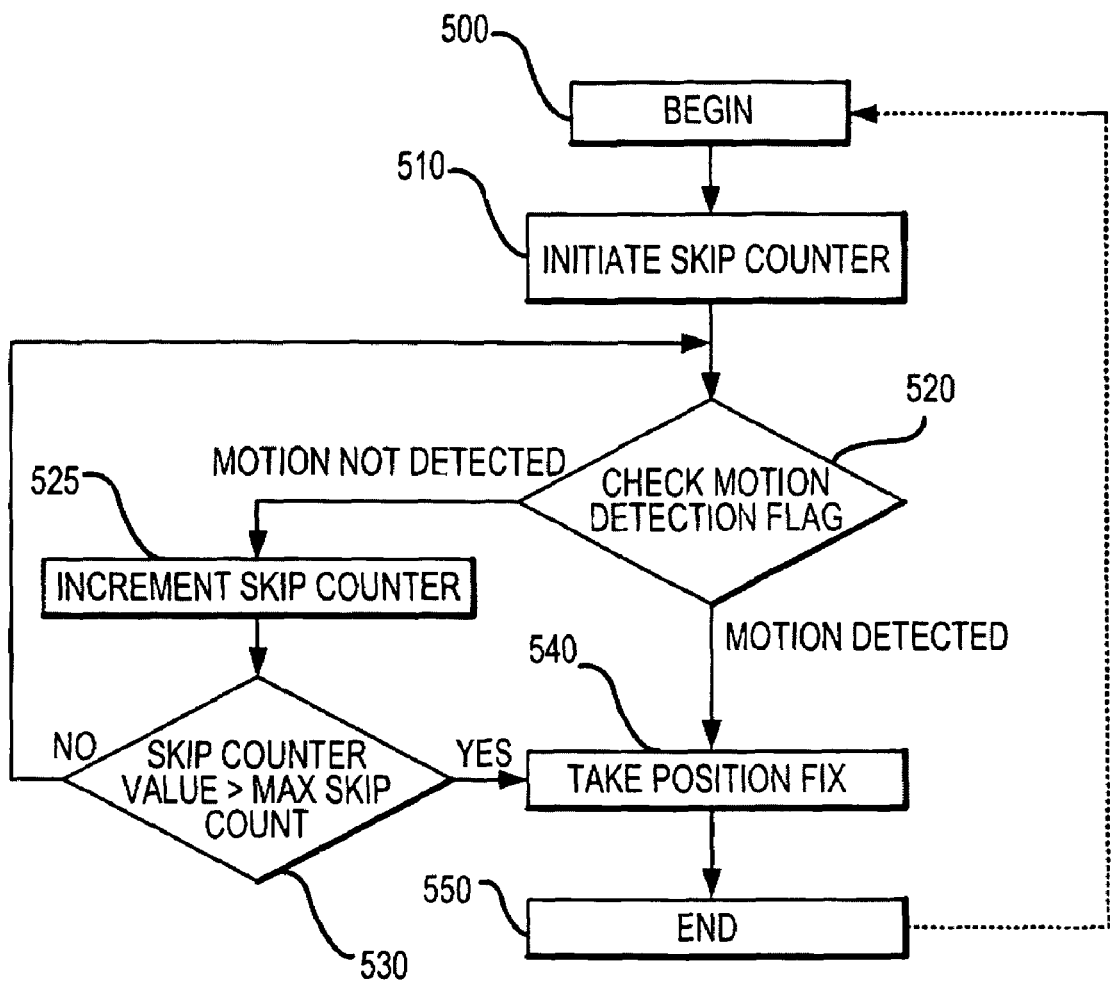
FIGS. 5 and 6 are illustrative flow diagrams for determining whether to update a position fix, in accordance with embodiments of the present invention.
Figure 6:
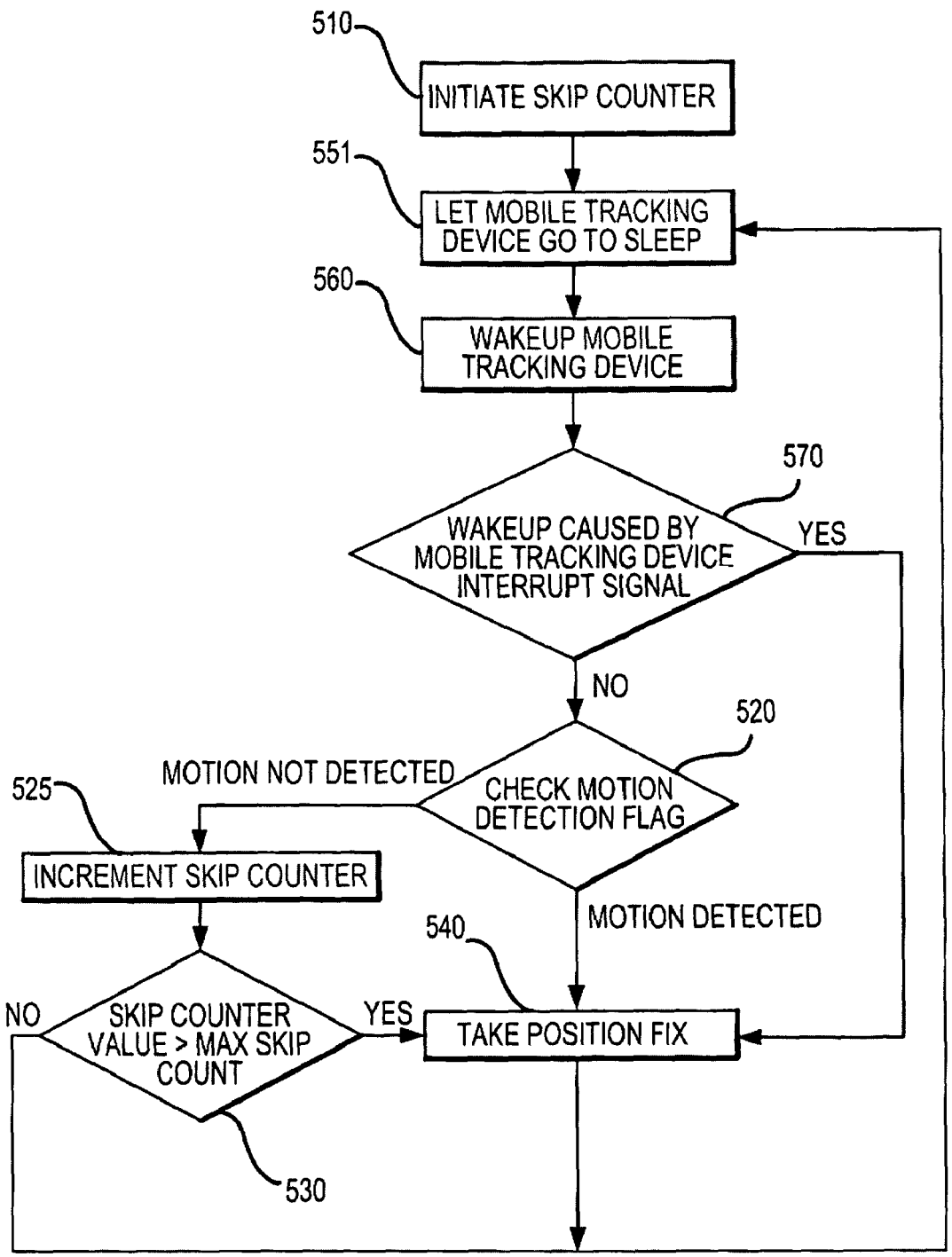

FIGS. 5 and 6 are illustrative flow diagrams for determining whether to update a position fix, in accordance with embodiments of the present invention. In FIG. 5, an illustrative flow diagram of an aspect for determining whether or not the mobile tracking device 400 should update a position fix is provided. As indicated previously, in one aspect, the mobile tracking device 400 includes a mobile tracking device skip counter 404. The mobile tracking device skip counter 404 counts the number of times the mobile tracking device 400 skips updating the last position fix with a new position fix. In one aspect, the mobile tracking device skip counter 404 is implemented within the signal processing unit 401 of the mobile tracking device 400.

The flow begins at block 500. Alternatively, block 500 generically represents any set of instructions or flow that the mobile tracking device 400 performs during the course of tracking the target prior to proceeding to block 510. In block 510, the mobile tracking device skip counter 404 is set at a skip counter initial value 501. One skilled in the art would understand that the skip counter initial value 501 pan be predetermined according to the system application or according to the user's choice.

In block 520, the mobile tracking device 400 checks the motion detection flag 228 and determines whether it is set. In one aspects the signal processing unit 401 in the mobile tracking device 400 checks the motion detection flag 228 to determine whether the motion detection flag 228 is set. If the motion detection flag 228 is set, the mobile tracking device 400 will update the last position fix (block 540). After updating the last position fix in block 540, the position updating process is complete at block 550. Alternatively, one of ordinary skill in the art would understand that block 550 could return to an earlier portion of flow, represented by block 500, as indicated in FIG. 5 with the dashed arrow from block 550 to block 500.

One of ordinary skill in the art would understand that many sources for updating the position fix are available to the mobile tracking device 400 including but not limited to various satellite positioning systems (SPSs), such as the United States Global Positioning System (GPS), the Russian Glonass system, the European Galileo system, any system that uses satellites from a combination of satellite systems, or any satellite system developed in the future. Furthermore, some positioning determination systems utilize terrestrial sources, such as but not limited to, pseudolites or a combination of satellite and terrestrial sources. One example of terrestrial sources is AFLT.

In block 520, if the motion detection flag 228 is not set, proceed to block 525, where the mobile tracking device skip counter 404 is incremented by one unit. One skilled in the art would understand that the choice of unit for the mobile tracking device skip counter 404 is based on system application or design choice.

In block 530, the mobile tracking device 400 determines whether the value of the mobile tracking device skip counter 404 is or is not greater than a maximum skip count 405, which is a predetermined maximum threshold value and represents the maximum number of times the mobile tracking device can skip taking a position fix. One skilled in the art would understand that the value for the maximum skip count 405 is set according to the system applications. In one aspect, the maximum skip count 405 is set to 10. If the value of the mobile tracking device skip counter 404 is greater than the maximum skip count 405, proceed to block 540 where the mobile tracking device 400 will update the last position fix. In this way, if the position fix has not been updated for a predetermined period (e.g., a predetermined number of times), the last position fix is updated even though the motion detection flag 228 is not set. If the mobile tracking device 400 determines that the value of the mobile tracking device skip counter 404 is not greater than the maximum skip count 405, then the process loops back to block 520. In one aspect, when the process is complete at block 550, the mobile tracking device 400 enters a sleep mode. In another aspect, the process begins at block 500 with an interrupt signal to wakeup the mobile tracking device 400. In one aspect, a wait time precedes block 520. The wait time is set based on parameters associated with the mobile tracking device 400. In one example, the wait time is set to 3 minutes.

The illustrative flow diagrams of FIGS. 4 and 5 can be used to track a human. In one aspect for tracking human movement, the mobile tracking device 400 is designed to take a position fix every fix interval. In another aspect, the parameters described herein can be set as follows. The maximum skip count 405 is set to 10 indicating that the mobile tracking device 400 will skip taking fixes a maximum of 10 times. The value of the accumulator positive increment 161 is set to 5. The value of the accumulator negative increment 171 is set to 1. The value of the predetermined accumulator limit 181 is set to 55. The counter 224 of the motion detection unit 200 is incremented in periods of one second and the counting period (during which transitions detected by the motion detector/sensor 210 are counted) is also set to one second. The value of threshold counter maximum 191 is set to infinite. The mobile tracking device interrupt flag is cleared. The operation of this aspect is described briefly below.

The mobile tracking device 400 checks the motion detection flag 228 before taking a position fix. If the motion detection unit 200 indicates that no movement was detected (e.g., the motion detection flag 228 is clear), the mobile tracking device 400 skips taking a position fix, unless ten opportunities to take a position fix have been skipped (corresponding to the maximum skip count 405), in which case a new position fix is taken. If the motion detection unit 200 indicates that movement was detected, (e.g., the motion detection flag 228 is set high), the mobile tracking device 400 also takes a new position fix. The mobile tracking device 400 is not interrupted by the motion detection unit 200. The mobile tracking device 400 will ask the motion detection unit 200 for a status update if needed.

In another aspect, the mobile tracking device 400 is allowed to enter a sleep mode between position fixes. One of ordinary skill in the art would understand that, in one aspect, the signal processing unit 401 enters a sleep mode. In one aspect, the mobile tracking device 400 will wake up periodically, or at predetermined times, and check the motion information 223 to determine whether to obtain a new position fix.

In another aspect, the mobile tracking device 400 includes a mobile tracking device unsolicited fix flag 406. The mobile tracking device unsolicited fix flag 406 may be set low or cleared, or to a value indicating that the mobile tracking device 400 does not permit the motion detection unit 200 to wake up or interrupt the mobile tracking device 400 to cause the mobile tracking device 400 to obtain an updated position fix out of sequence. In modes in which the mobile tracking device unsolicited fix flag 406 is set low or cleared, the mobile tracking device interrupt flag 311 may be correspondingly set low or cleared. Alternatively, in modes in which the mobile tracking device unsolicited fix flag 406 is low or cleared, a mobile tracking device interrupt signal 321 may be ignored by the mobile tracking device 400.

In one aspect, the mobile tracking device unsolicited fix flag 406 may be set high or to a value indicating that the mobile tracking device 400 can be or permits the motion detection unit 200 to wake up or interrupt the mobile tracking device 400 and cause the mobile tracking device 400 to obtain an updated position fix. In modes in which the mobile tracking device unsolicited fix flag 406 is set to a value indicating that the mobile tracking device 400 permits the motion detection unit 200 to wake up or interrupt the mobile tracking device 400, the mobile tracking device interrupt flag 311 may be correspondingly set high.

FIG. 6 provides an illustrative flow diagram of an aspect for determining whether or not the mobile tracking device 400 should update a position fix when the mobile tracking device unsolicited fix flag 406 is set high. The blocks shown in FIG. 6 that are the same as those described in FIG. 5 have the same numbers. Descriptions of these blocks are not repeated here unless necessary for context.

In block 510, the mobile tracking device skip counter 404 is set at a skip counter initial value 501. One skilled in the art would understand that the skip counter initial value 501 can be predetermined according to the system application or according to the user's choice.

In block 551, the mobile tracking device 400 is put to sleep. In one aspect, "the mobile tracking device 400 is put to sleep" means that the signal processing unit 401 is put to sleep. In block 560, the mobile tracking device 400 is awakened. Similarly, in one aspect, if the signal processing unit 401 was put to sleep, then the signal processing unit 401 is awakened here. The wakeup in block 560 can be caused by the mobile tracking device 400. In one aspect, the wakeup process is caused by a watchdog timer. Alternatively, the wakeup in block 560 can be caused by a interrupt signal 321 generated by the motion detection unit 200.

In block 570, the mobile tracking device 400 evaluates whether the wakeup was caused by a mobile tracking device interrupt signal 321. In one aspect, the signal processing unit 401, of the mobile tracking device 400 checks to determine whether the wakeup was caused by a mobile tracking device interrupt signal 321. If the wakeup was caused by a mobile tracking device interrupt signal 321, the mobile tracking device 400 takes a position fix (block 540), and the mobile tracking device 400 goes back to sleep (block 551). Although not shown in FIG. 6, in one aspect, if a new position fix is taken as a result of wakeup was caused by a mobile tracking device interrupt signal 321, the new position fix is reported, for example to a user, before the mobile tracking device 400 goes back to sleep.

If the wakeup was not caused by a mobile tracking device interrupt signal 321, the mobile tracking device 400 proceeds to block 520. In block 520, the mobile tracking device 400 checks the motion detection flag 228 and determines whether it is set. In one aspect, the mobile tracking device signal processing unit 401 of the mobile tracking device 400 checks the motion detection flag 228 to determine whether the motion detection flag 228 is set. If the motion detection flag 228 is set, the mobile tracking device 400 will update the last position fix (block 540), and the mobile tracking device goes back to sleep (block 551).

If the motion detection flag 228 is not set (block 520), the mobile tracking device skip counter 404 is incremented by one unit (block 525), and the mobile tracking device 400 determines whether the value of the mobile tracking device skip counter 404 is or is not greater than a maximum skip count 405 (block 530), representing the maximum number of times the mobile tracking device 400 can skip taking a position fix. One skilled in the art would understand that the value for the maximum skip count 405 is set according to the system applications. In one aspect, the maximum skip count 405 is set to 10. If the value of the mobile tracking device skip counter 404 is greater than the maximum skip count 405, the mobile tracking device 400 will update the last position fix (block 540). In this way, if the position fix has not been updated for a predetermined period (e.g., a predetermined number of times); the last position fix is updated even though the motion detection flag 228 is not set. If the mobile tracking device 400 determines that the value of the mobile tracking device skip counter 404 is not greater than the maximum skip count 405 (block 530), the process loops back to block 551 and mobile tracking device 400 goes back to sleep.

In one aspect, assets such as personal property can be tracked. Asset tracking can be implemented in several aspects. Asset tracking could involve asset movement detection. Two illustrative modes for asset movement detection can be implemented based on the mobile tracking device unsolicited fix flag 406. In one aspect of one mode, if the mobile tracking device unsolicited fix flag 406 is set low or cleared, flow diagrams of FIGS. 4 and 5 illustrate one possible aspect that can be used to track the assets. In one aspect for asset tracking using movement detection with the mobile tracking device unsolicited fix flag 406 set low or cleared, the mobile tracking device 400 is designed to take a position fix every fix interval. In another aspect for asset tracking using movement detection with the mobile tracking device unsolicited fix flag 406 is set low or cleared, parameters described herein can be set as follows. The maximum skip count 405 is set to 10 indicating that the mobile tracking device 400 will skip taking fixes a maximum of 10 times. The value of the accumulator positive increment 161 is set to 16. The value of the accumulator negative increment 171 is set to 1. The value of the predetermined accumulator limit 181 is set to 91. The motion counter 224 is incremented in periods of one second and the counting period (during which transitions detected by the motion defector/sensor 210 are counted) is also set to one second. The value of threshold counter maximum 191 is set to 20. The mobile tracking device interrupt flag may be low or high, and the predetermined delay Td 192 may be set to 16 or any other value, as the mobile tracking device unsolicited fix flag 406 is low (unsolicited fix disabled). The operation of this aspect is described briefly below.

The mobile tracking device 400 checks the motion detection flag 228 before taking a position fix. If the motion detection unit 200 indicates that no movement was detected (e.g., the motion detection flag 228 is clear), the mobile tracking device 400 skips taking a position fix, unless the ten opportunities to take a position fix have been skipped (corresponding to the maximum skip count 405), in which case a new position fix is taken. If the motion detection unit 200 indicates that movement was detected, (e.g., the motion detection flag 228 is set high), the mobile tracking device 400 takes a new position fix.

In an aspect of a second mode, if the mobile tracking device unsolicited fix flag 406 is set high, the flow diagrams of FIGS. 4 and 6 illustrate one possible aspect that can be used to track the assets. In one aspect for asset tracking using movement detection with the mobile tracking device unsolicited fix flag 406 set high, the mobile tracking device 400 is designed to take a position fix every fix interval. In another aspect for asset tracking using movement detection with the mobile tracking device unsolicited fix flag 406 is set high, parameters described herein can be set as follows. The maximum skip count 405 is set to 10 indicating that the mobile tracking device 400 will skip taking fixes a maximum of 10 times. The value of the accumulator positive increment 161 is set to 16. The value of the accumulator negative increment 171 is set to 1. The value of the predetermined accumulator limit 181 is set to 91. The counter 224 is incremented in periods of one second and the counting period (during which transitions detected by the motion detector/sensor 210 are counted) is also set to one second. The value of threshold counter maximum 191 is set to 20. The mobile tracking device interrupt flag should be set high, and the predetermined delay Td 192 may be set to 16, as the mobile tracking device unsolicited fix flag 406 is high (unsolicited fix enabled). The operation of this aspect is described briefly below.

The mobile tracking device 400 checks the motion detection flag 228 every wakeup period and before taking a position fix. If this is a wakeup that should include a position fix and the motion detection unit 200 indicates that movement was detected, (e.g., the motion detection flag 228 is set high), the mobile tracking device takes a new position fix. If this is a wakeup that should include a position fix and the motion detection unit 200 indicates that no movement was detected (e.g., the motion detection flag 228 is clear), the mobile tracking device skips the position fix, unless ten opportunities to take a position fix have been skipped (corresponding to the maximum skip count 405), in which case a new position fix is taken. If this is a wakeup that does not normally include a position fix, but the motion detection unit 200 has awaken the mobile tracking device 400 or the motion detection unit 200 otherwise, notifies the mobile tracking device 400 that movement was detected, (e.g., the motion detection flag 228 is set high), the mobile tracking device 400 takes a new position fix, and sends the unsolicited new position fix to a user, communication network, or tracking system, such as the SPS or other positioning determination system of which the mobile tracking device 400 is a part.

In another aspect, the motion detection unit 200 can implement debounce to determine whether sufficient motion has been detected. One of ordinary skill in the art would understand that bouncing is the tendency of any two metal contacts in an electronic device such as a motion detector/sensor to generate multiple signals as the contacts close or open. One of ordinary skill in the art would further understand that debouncing can be a hardware implementation or a software implementation that ensures that only a single signal will be acted upon for a single opening or closing of a contact in a device such as a motion detector/sensor. Debouncing helps ensure that only one indication of movement is registered within a given debounce time period. One skilled in the art would understand that a debounce time period is set according to the design choice or application parameters.

Figure 7:
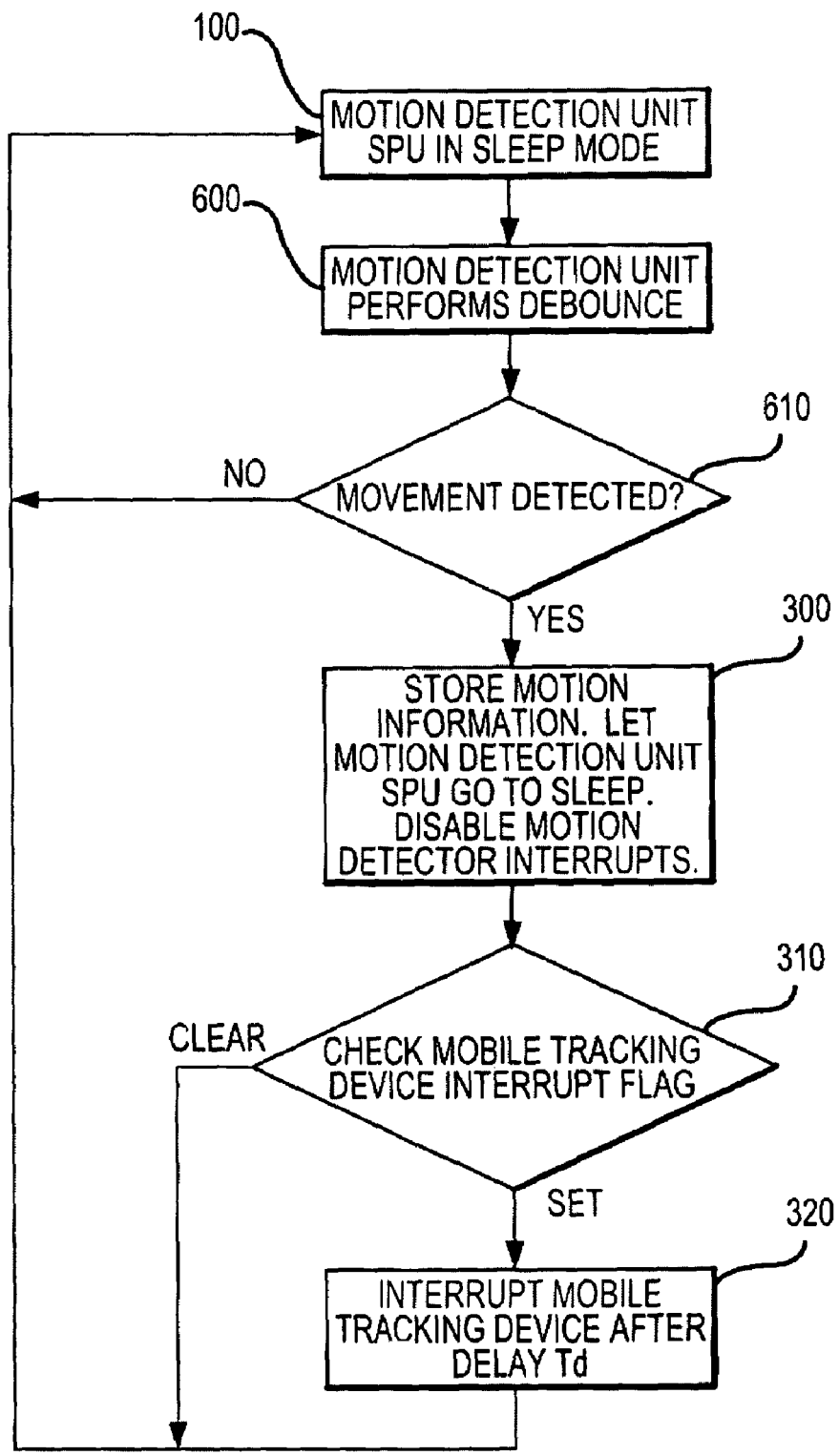
FIGS. 7, 8 and 9 are illustrative flow diagrams for determining movement of a target being tracked, in accordance with embodiments of the present invention.
Figure 8:
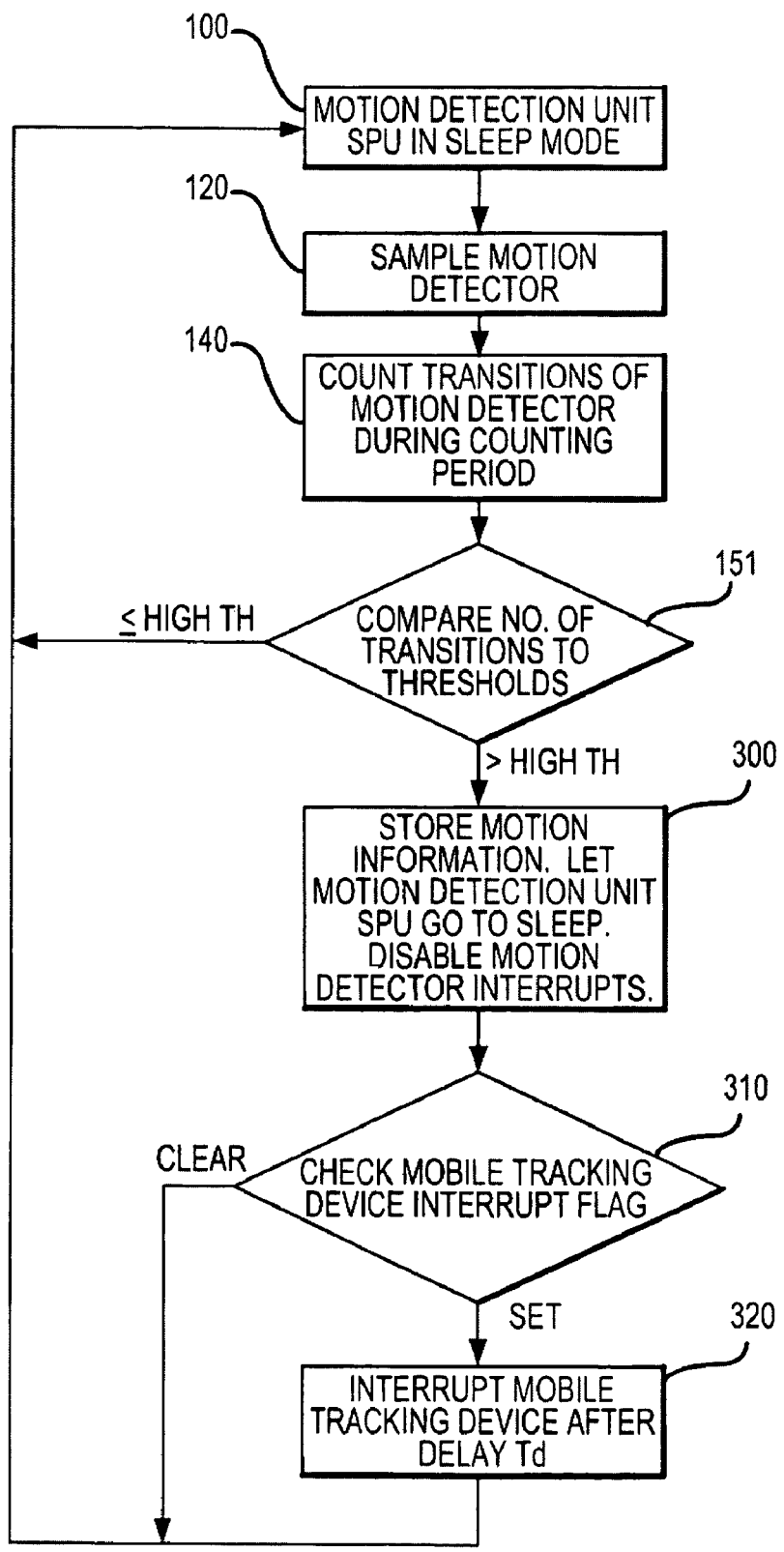
Figure 9A:
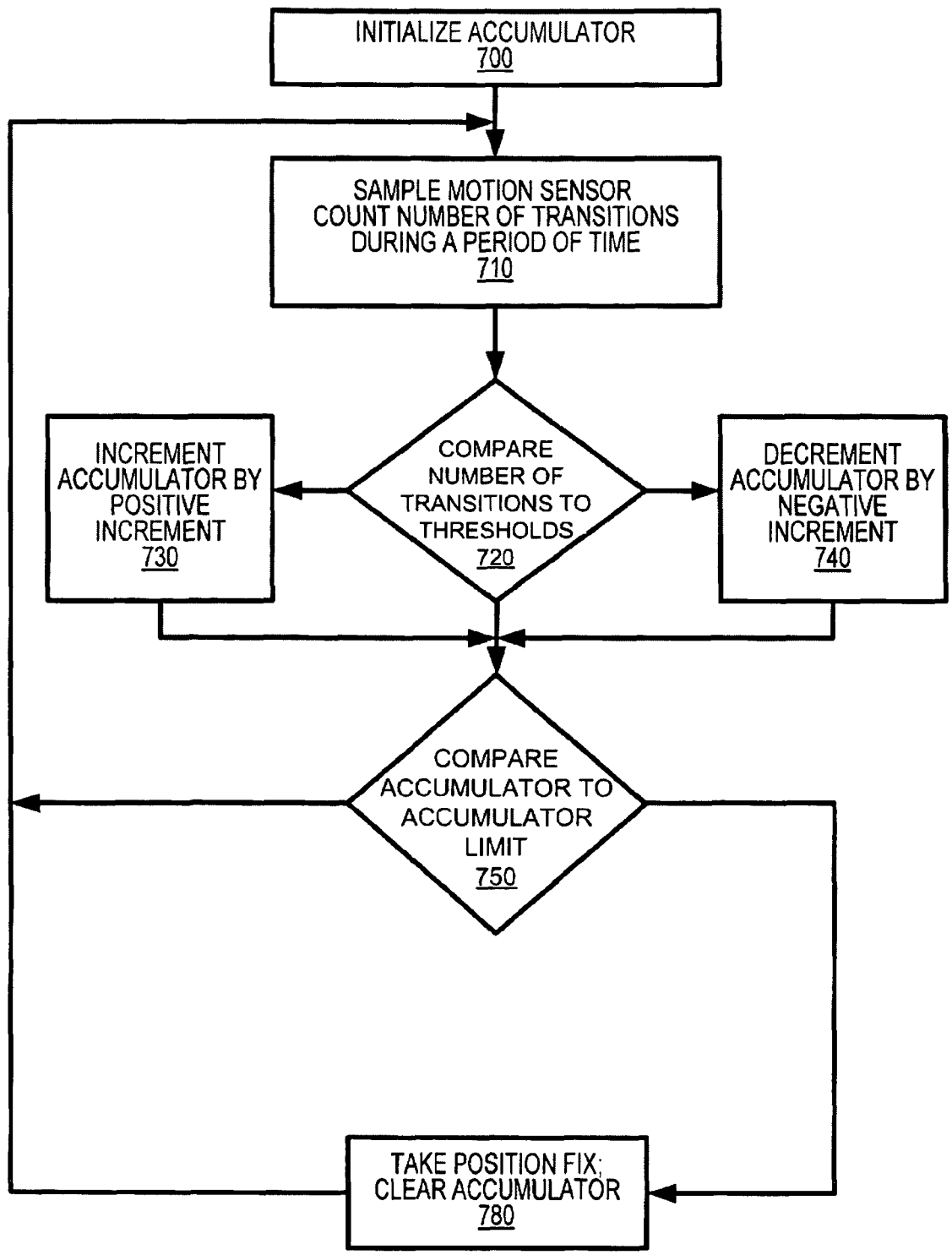

FIGS. 7, 8 and 9 are illustrative flow diagrams for determining movement of a target being tracked, in accordance with embodiments of the present invention.

In FIG. 7 an illustrative flow diagram of an aspect of the motion detection unit 200 that makes use of de-bounce logic is provided. Blocks that perform the same function in FIG. 7 and FIG. 4 have been labeled with the same numeric identifier. Descriptions of these blocks are not repeated here except to provide context.

In block 100, the signal processing unit 220 is in sleep mode. If the motion detector/sensor 210 detects motion, the motion detector/sensor 210 generates a trigger signal 201 in response to the detected motion. The trigger signal 201 from the motion detector/sensor 210 will interrupt the sleep mode and wake the signal processing unit 220 out of sleep mode. In an alternative aspect, the trigger signal 201 is generated by the signal processing unit 220 in response to an intermediate signal 101 from the motion detector/sensor 210. The intermediate signal 101 indicates that motion has been detected by the motion detector/sensor 210.

In block 600, the motion detection unit 200 performs debounce. In one aspect, the signal processing unit 220 will perform a debounce algorithm. Alternatively, one of ordinary skill in the art would understand that the debounce can be implemented by hardware.

In block 610, the motion detection unit 200 will use the results of the debounce to determine whether movement was detected. If movement was not detected, the routine returns to block 100 and the signal processing unit 220 is placed in sleep mode.

If movement was detected in block 610, the routine proceeds to block 300 to store motion information 223 in memory 222. In one aspect, the motion information 223 includes a motion detection flag 228. In another aspect, the motion information 223 includes information processed by the signal processing unit 220 regarding the movement detected. In another aspect, the motion information 223 includes information regarding displacement, velocity, acceleration, magnitude or duration of motion, or other information regarding the motion of the target being tracked.

Additionally, at block 300, the motion detection unit 200 can let the signal processing unit 220 go to sleep mode, and disable the motion detector/sensor 210 interrupts. Alternatively, one of ordinary skill in the art would understand that the motion information 223 can comprise more than one instance of detected motion, in which case the motion detector interrupt would remain enabled. In another aspect, new motion information 223 is stored in memory 222 if the new motion information 223 corresponds to greater motion than the motion information 223 stored in memory 222.

In block 310, the status of a mobile tracking device interrupt flag 311 is checked. In one aspect, the mobile tracking device interrupt flag 311 includes at least one value to indicate that the mobile tracking device 400 should be interrupted if sufficient movement of the target being tracked has been detected. In another aspect, the mobile tracking device interrupt flag 311 includes at least one value indicating that the mobile tracking device 400 should not be interrupted. One of ordinary skill in the art would understand that the values of the mobile tracking device interrupt flag 311 can be set in various manners. For example, the values of the mobile tracking device interrupt flag 311 can be set by the mobile tracking device 400, the signal processing unit 220, or a user of the mobile tracking device 400. One of ordinary skill in the art would understand that the mobile tracking device interrupt flag 311 may be stored in a memory 222, or a mobile tracking device memory 402.

If the value of the mobile tracking device interrupt flag 311 indicates that the mobile tracking device 400 should not be interrupted, the motion detection unit routine returns to block 100. If the value of the mobile tracking device interrupt flag 311 indicates that the mobile tracking device 400 should be interrupted, the motion detection unit 200 generates a mobile tracking device interrupt signal 321 to interrupt the mobile tracking device 400. In one aspect, the mobile tracking device interrupt signal 321 may be generated by a mobile tracking device interrupt signal generating unit 322. The mobile tracking device interrupt signal generating unit 322 may be the signal processing unit 220, or a component that is not within the motion detection unit 200, such as a buffer.

The mobile tracking device interrupt signal 321 is communicated to the mobile tracking device 400 after a predetermined delay Td 192. Alternatively, the mobile tracking device interrupt signal 321 is generated after a predetermined delay Td 192. One of ordinary skill in the art would understand that the value of the predetermined delay Td 192 can be set in various manners. For example, the value of the predetermined delay Td 192 can be set by the mobile tracking device 400, the signal processing unit 220, or a user of the mobile tracking device 400. One of ordinary skill in the art would understand that the value of the predetermined delay Td 192 may be stored in a memory 222, or a mobile tracking device memory 402.

The mobile tracking device 400 uses the motion information 223, including, if implemented, the motion detection flag 228, to determine whether to update the last position fix. In one aspect, if the motion information 223 indicates that sufficient motion was not detected, the mobile tracking device 400 skips taking a position fix. If the motion information 223 indicates that sufficient motion was detected, the mobile tracking device 400 takes a new position fix. In one aspect, the mobile tracking device interrupt signal 321 causes the mobile tracking device 400 to take a position fix more promptly than it ordinarily might.

FIG. 8 is an illustrative flow diagram of an aspect of the motion detection unit 200 that makes use of debounce implemented by the signal processing unit 220. The blocks shown in FIG. 8 that are the same as those described in FIGS. 4 and 7 have been labeled with the same numbers. Descriptions of these blocks are not repeated here except to provide context.

In block 100, the signal processing unit 220 is in sleep mode. If the motion detector/sensor 210 detects motion, the motion detector/sensor 210 generates a trigger signal 201 in response to the detected motion. The trigger signal 201 from the motion detector/sensor 210 will interrupt the sleep mode and wake the signal processing unit 220 out of sleep mode. In an alternative aspect, the trigger signal 201 is generated by the signal processing unit 220 in response to an intermediate signal 101 from the motion detector/sensor 210. The intermediate signal 101 indicates that motion has been detected by the motion detector/sensor 210.

In block 120, motion data 121 measured by the motion detector/sensor 210 is sampled. The sampling of the motion data 121 may be performed by the motion detector/sensor 210, or the signal processing unit 220. If sampling is performed by the motion detector/sensor 210, the sample values are transmitted to the signal processing unit 220. The sample values may be stored in memory 222. In one aspect, the sampling frequency is set at 500 Hz or above.

In block 140, the number of transitions made by the motion detector/sensor 210 in a predetermined counting period is counted. For example, the number of transitions from a low signal level to a high signal level measured by the motion detector/sensor 210 may be counted. Or, the number of transitions from a high signal level to a low signal level may be counted. Alternatively, the number of transitions from a low signal level to a high signal level and the number of transitions from a high signal level to a low signal level may be counted. One skilled in the art would understand that the parameter for defining a transition may vary according to the design or application parameters without affecting the scope of the disclosure.

In one aspect, the motion detector/sensor 210 counts the transition. In another aspect, the signal processing unit 220 counts the transition. In one aspect, the number of transitions counted is stored in memory 222. And, in one aspect, the counting period is set to one second.

In block 151, the number of transitions counted is compared with one threshold value (High TH). In one aspect, this comparison is made by the signal processing unit 220. If the number of transitions counted during the counting period is not greater than the High TH, sufficient movement was not detected, the routine returns to block, 100 and the signal processing unit 220 is placed in sleep mode. If the number of transitions counted during the counting period is greater than the High TH, then sufficient movement has been detected.

One of ordinary skill in the art would understand that the value of High TH may be chosen according to the system parameters, such as but not limited to, the sampling frequency or to the inherent parameters of the motion detector/sensor used.

If sufficient movement was detected in block 151, the illustrative routine proceeds to block 300. The remainder of the illustrative routine is the same as provided in FIGS. 4 and 7 and their corresponding descriptions, and will not be repeated here.

In another aspect involving tracking assets such as personal property, asset tracking can involve triggering on asset movement detection. Two illustrative modes for asset trigger detection can be implemented based on the mobile tracking device unsolicited fix flag 406. In one aspect of one mode, if the mobile tracking device unsolicited fix flag 406 is set low or cleared, flow diagrams of FIGS. 5 and 8 illustrate one possible implementation that can be used to perform asset trigger detection. In one aspect for asset trigger detection using movement detection with the mobile tracking device unsolicited fix flag 406 set low or cleared, the mobile tracking device 400 is designed to take a position fix every fix interval. In another aspect for asset tracking using movement detection with the mobile tracking device unsolicited fix flag 406 is set low or cleared, parameters described herein can be set as follows. The maximum skip count 405 is set to 10 indicating that the mobile tracking device 400 will skip taking fixes a maximum of 10 times. The counting period (during which transitions detected by the motion detector/sensor 210 are counted) is set to one second. The mobile tracking device interrupt flag may be low or high, and the predetermined delay Td 192 may be set to 8 or any other value, as the mobile tracking device unsolicited fix flag 406 is low (unsolicited fix disabled). The operation of this aspect is described briefly below.

The mobile tracking device 400 should check the motion detection flag 228 before taking a position fix. If the motion detection unit 200 indicates that no movement was detected (e.g., the motion detection flag 228 is clear), the mobile tracking device 400 skips taking a position fix, unless the ten opportunities to take a position fix have been skipped (corresponding to the maximum skip count 405), in which ease a new position fix is then taken. If the motion detection unit 200 indicates that movement was detected, (e.g., the motion detection flag 228 is set high), the mobile tracking device 400 takes a new position fix.

In an aspect of a second mode, if the mobile tracking device unsolicited fix flag 406 is set high, flow diagrams of FIGS. 6 and 8 illustrate one possible aspect that is used to perform asset trigger detection. In one aspect for asset trigger detection using movement detection with the mobile tracking device unsolicited fix flag 406 set high, the mobile tracking device 400 is designed to take a position fix every fix interval. In another aspect for asset trigger detection using movement detection with the mobile tracking device unsolicited fix flag 406 set high, parameters described herein can be set as follows. The maximum skip count 405 is set to 10 indicating that the mobile tracking device 400 will skip taking fixes a maximum of 10 times. The counting period (during which transitions detected by the motion detector/sensor 210 are counted) is set to one second. The mobile tracking device interrupt flag should be set high, and the predetermined delay Td 192 may be set to 8, as the mobile tracking device unsolicited fix flag 406 is high (unsolicited fix enabled). The operation of this aspect is described briefly below.

The mobile tracking device 400 checks the motion detection flag 228 every wakeup period and before taking a position fix. If this is a wakeup that should include a position fix and the motion detection unit 200 indicates that movement was detected, (e.g., the motion detection flag 228 is set high), the mobile tracking device 400 takes a new position fix. If this is a wakeup that should include a position fix and the motion detection unit 200 indicates that no movement was detected (e.g., the motion detection flag 228 is clear), the mobile tracking device 400 skips the position fix, unless ten opportunities to take a position fix have been skipped (corresponding to the maximum skip count 405), in which case a new position fix is taken. If this is a wakeup that does not normally include a position fix, but the motion detection unit 200 has awaken the mobile tracking device 400 or the motion detection unit 200 otherwise notifies the mobile tracking device 400 that movement was detected, (e.g., the motion detection flag 228 is set high), the mobile tracking device 400 takes a new position fix, and sends the unsolicited new position fix to a user, communication network, or tracking system, such as the SPS or other positioning determination system of which the mobile tracking device 400 is a part.

FIG. 9 shows a method of determining a motion event before taking a position fix by using a three level quantizer, thereby saving power by limiting the number of position fixes taken. In block 700, a motion detection unit 200 initializes a loop by clearing an accumulator 226. A variable in memory or a register in a processor may serve as the accumulator 226. In block 710, the motion detection unit 200 samples and counts. First, the motion detection unit 200 samples a motion sensor, such as an omni-directional tilt and vibration sensor, to measure movement of a target, which results in motion data. The sampling may occur at a predefined sampling rate (e.g., at a rate of 500 Hz). Next, the motion detection unit 200 may process this motion data over a period of time (e.g., 1 second). Processing may entail counting a number of transitions (e.g., low to high transitions), thus resulting in a total count of transitions over the period as motion information.

In block 720, the total number of transitions over the period (i.e., the motion data) is categorized by comparing the total to two thresholds thereby resulting in three levels of quantization. If the total number of transitions is above a higher threshold (count> High_TH), the motion detection unit 200 declares movement for the sampled period and proceeds to block 730 to increase an accumulated value. If the total number of transitions is above a second different lower threshold (count< Low_TH), the motion detection unit 200 declares no movement for the sampled period and proceeds to block 740 to decrease the accumulated value. If the total number of transitions falls between the higher threshold and lower threshold (High_TH>=count>=Low_TH), the motion detection unit 200 bypasses adjusting the accumulated value.

In block 730, the motion detection unit 200 increments the accumulator 226 by a positive increment. For illustrative purposes, assume High_TH is 2, Low_TH is 1 and the positive increment is 1.0. If the total number of transitions is 3 or greater, block 730 is executed to increase the accumulator 226 (initialized to 0) to 1.0. Say a second pass through blocks 710 and 720 results in another total number of transitions is 3 or greater, block 730 is executed again to increase the accumulator 226 by the positive increment from 1.0 to 2.0. Processing continues with block 750.

In block 740, the motion detection unit 200 decrements the accumulator 226 by a negative increment. For illustrative purposes, again assume High_TH is 2, Low_TH is 1 and the negative increment is 0.2. If the positive increment (i.e., the magnitude of the positive increment) is greater than the negative increment (i.e., the magnitude of the negative increment), then the motion diction unit 200 triggers more often with constant movement and less often with sharp or inconsistent movement. If the total number of transitions is 0 (i.e., less than Low_TH), block 740 is executed to decrease the accumulator 226 (previously 2.0) to 1.8. Say a second pass through blocks 710 and 720 results in another total number of transitions of 0, block 740 is executed again to decrease the accumulator 226 by the negative increment from 1.8 to 1.6. Processing continues with block 750.

In block 750, the motion detection unit 200 compares the accumulator 226 to an accumulator limit 181. The accumulator limit 181 affects the sensitivity of the detector. A higher value lowers the sensitivity and a lower value raises the sensitivity. If the accumulator 266 reaches the accumulator limit 181, the motion detection unit 200 may generate a movement alarm. As shown in block 780, the movement alarm may be used to interrupt or wake the mobile tracking unit 400 to initiate a position fix and to clear the accumulator 266. The movement alarm may be an interrupt or may initiate the enabling of a flag periodically check to determine whether to wake the mobile tracking unit 400.

Figure 9B:
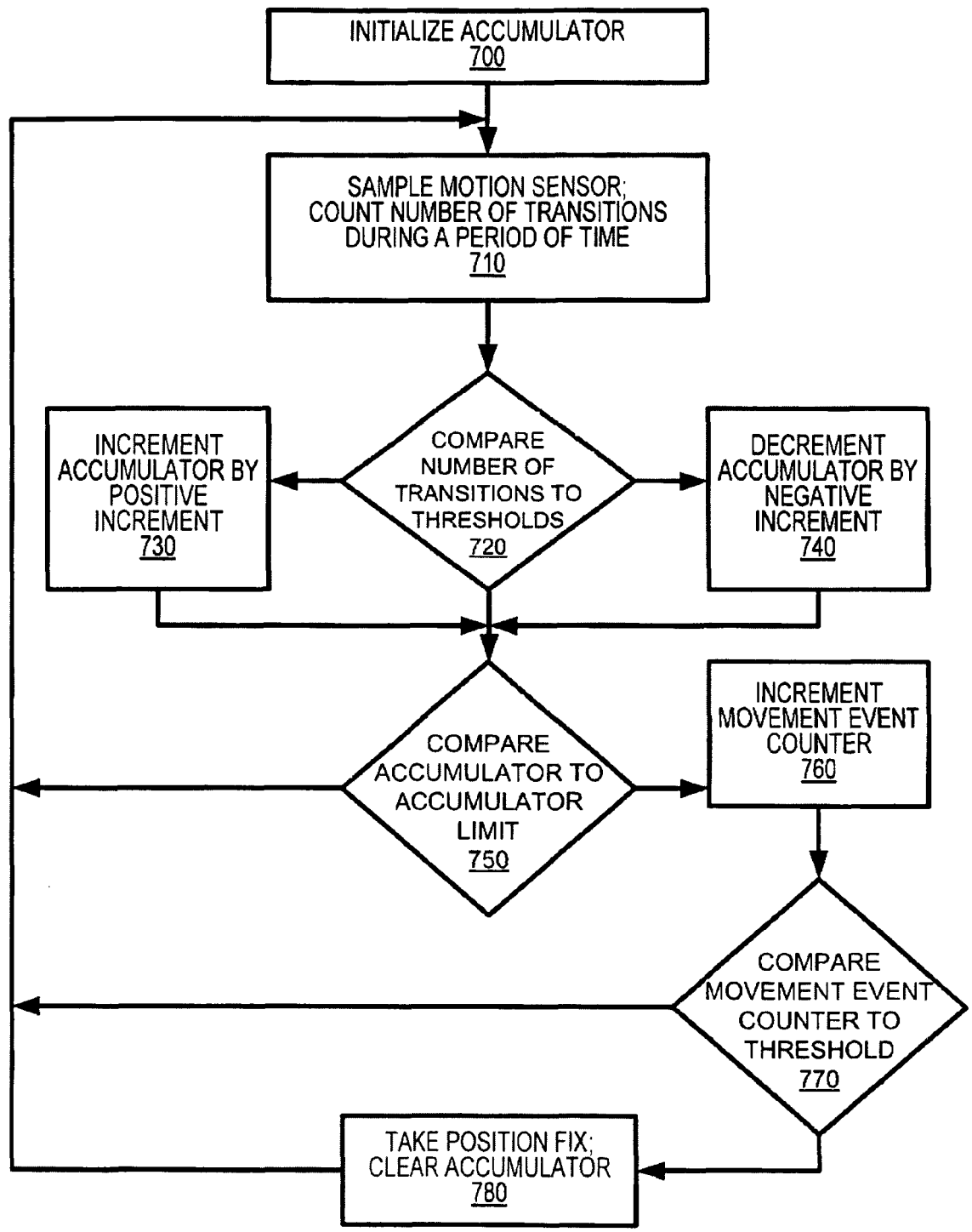

Alternatively, as shown in FIG. 9B, processing may proceed from 750 to 760 to delay the movement alarm. If the accumulator 266 reaches the accumulator limit 181, motion detection unit 200 may increment a movement event counter. In block 770, the motion detection unit 200 compares the movement counter to a threshold. If above the threshold, in block 780, the motion detection unit 200 may generate a movement alarm. Again, the movement alarm may be used to interrupt or wake the mobile tracking unit 400 to initiate a position fix.

After block 780 or from block 750 (if the accumulator 266 is less than the accumulator limit), processing loops back to block 750 to repeat the cycle with the next period.

The methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Various modifications to the descriptions and features herein will be readily apparent to those of ordinary skill in the art, and the generic principles defined herein may be applied to other aspects without departing from the spirit or scope of the disclosure.

The invention claimed is:

1. A method for tracking a target associated with a motion detection unit and a mobile tracking unit, the method comprising:
   initializing an accumulator;
   processing the motion data to generate motion information; and
   quantizing the motion information into three levels then
   incrementing the accumulator by a positive increment, if the motion information falls into a first level;
   bypassing adjusting the accumulator, if the motion information falls into a second level; and
   decrementing the accumulator by a negative increment, if the motion information falls into a third level;
   comparing the accumulator to an accumulator limit; and
   taking a position fix, if the accumulator meets the accumulator limit.

2. The method of claim 1, wherein the act of processing the motion data to generate the motion information comprises counting a number of transitions during a period of time.

3. The method of claim 2, wherein the act of quantizing the motion information into the three levels comprises:
   categorizing the number of transitions to the first level, if the number of transitions is above a high threshold (High_TH);
   categorizing the number of transitions to the second level, if the number of transitions is between the high threshold and above a low threshold, inclusive; and
   categorizing the number of transitions to the third level, if the number of transitions is below the low threshold (Low_TH).

4. The method of claim 1, wherein a magnitude of the positive increment is greater than a magnitude of the negative increment.

5. The method of claim 1, wherein the act of taking the position fix, if the accumulator meets the accumulator limit, comprises:
   incrementing a movement event counter, taking a position fix, if the accumulator meets the accumulator limit;
   comparing the movement event counter to a threshold; and
   taking the position fix, if the movement event counter meets the threshold.

6. A device for tracking a target, the device comprising:
   a motion detection unit comprising
      a sensor to provide motion data;
      an accumulator;
      a processor to process the motion data to generate motion information;
      a quantizer to quantizing the motion information into three levels;
      an adder to increment the accumulator by a positive increment, if the motion information falls into a first level;
      logic to bypass adjusting the accumulator, if the motion information falls into a second level;
      a subtractor to decrementing the accumulator by a negative increment, if the motion information falls into a third level; and
      a comparator to compare the accumulator to an accumulator limit; and
   a mobile tracking unit to take a position fix, if the accumulator meets the accumulator limit.

7. The device of claim 6, wherein the processor comprises a counter to count a number of transitions during a period of time.

8. The device of claim 7, wherein the three levels comprises:
   the first level, if the number of transitions is above a high threshold (High_TH);
   the second level, if the number of transitions is between the high threshold and above a low threshold, inclusive; and
   the third level, if the number of transitions is below the low threshold (Low_TH).

9. The device of claim 6, wherein a magnitude of the positive increment is greater than a magnitude of the negative increment.

10. A device for tracking a target associated with a motion detection unit and a mobile tracking unit, the device comprising:
   means for initializing an accumulator;
   means for processing the motion data to generate motion information; and
   means for quantizing the motion information into three levels then
      means for incrementing the accumulator by a positive increment, if the motion information falls into a first level;
      means for bypassing adjusting the accumulator, if the motion information falls into a second level; and
      means for decrementing the accumulator by a negative increment, if the motion information falls into a third level;
   means for comparing the accumulator to an accumulator limit; and
   means for taking a position fix, if the accumulator meets the accumulator limit.

11. The method of claim 10, wherein the means for processing the motion data to generate the motion information comprises means for counting a number of transitions during a period of time.

12. The method of claim 11, wherein the means for quantizing the motion information into the three levels comprises:
   means for categorizing the number of transitions to the first level, if the number of transitions is above a high threshold (High_TH);
   means for categorizing the number of transitions to the second level, if the number of transitions is between the high threshold and above a low threshold, inclusive; and
   means for categorizing the number of transitions to the third level, if the number of transitions is below the low threshold (Low_TH).

13. The method of claim 10, wherein a magnitude of the positive increment is greater than a magnitude of the negative increment.

14. The method of claim 10, wherein the means for taking the position fix, if the accumulator meets the accumulator limit, comprises:
   means for incrementing a movement event counter, taking a position fix, if the accumulator meets the accumulator limit;
   means for comparing the movement event counter to a threshold; and
   means for taking the position fix, if the movement event counter meets the threshold.

15. A computer-readable medium including program code stored thereon for use in a mobile device to track a target associated with a motion detection unit and a mobile tracking unit, the program code comprising:
   program code to initialize an accumulator;
   program code to process the motion data to generate motion information; and
   program code to quantize the motion information into three levels then
      program code to increment the accumulator by a positive increment, if the motion information falls into a first level;
      program code to bypass adjusting the accumulator, if the motion information falls into a second level; and
      program code to decrement the accumulator by a negative increment, if the motion information falls into a third level;
   program code to compare the accumulator to an accumulator limit; and
   program code to take a position fix, if the accumulator meets the accumulator limit.

16. The method of claim 15, wherein the program code to process the motion data to generate the motion information comprises program code to counting a number of transitions during a period of time.

17. The method of claim 16, wherein the program code to quantize the motion information into the three levels comprises:
   program code to categorize the number of transitions to the first level, if the number of transitions is above a high threshold (High_TH);
   program code to categorize the number of transitions to the second level, if the number of transitions is between the high threshold and above a low threshold, inclusive; and
   program code to categorize the number of transitions to the third level, if the number of transitions is below the low threshold (Low_TH).

18. The method of claim 15, wherein a magnitude of the positive increment is greater than a magnitude of the negative increment.

19. The method of claim 15, wherein the program code to take the position fix, if the accumulator meets the accumulator limit, comprises:
   program code to increment a movement event counter, taking a position fix, if the accumulator meets the accumulator limit;
   program code to compare the movement event counter to a threshold; and
   program code to take the position fix, if the movement event counter meets the threshold.

20. A method for tracking a target associated with a motion detection unit and a mobile tracking unit, the method comprising:
   measuring motion of the target to produce motion data;
   processing the motion data to generate motion information; and
   comparing the motion information to a threshold; and
      if the motion information is greater than the threshold, instructing the mobile tracking unit to take a position fix; and
      if the motion information is less than the threshold, skipping to take a position fix.

* * * * *